(12) United States Patent
Ohara et al.

(10) Patent No.: US 6,683,834 B2
(45) Date of Patent: Jan. 27, 2004

(54) INFORMATION RECORDING METHOD, INFORMATION RECORDING/REPRODUCING APPARATUS, AND INFORMATION RECORDING MEDIUM

(75) Inventors: Shunji Ohara, Higashiosaka (JP); Takashi Ishida, Yawata (JP); Yoshikazu Goto, Hirakata (JP); Isao Satoh, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/382,063

(22) Filed: Mar. 5, 2003

(65) Prior Publication Data

US 2003/0165098 A1 Sep. 4, 2003

Related U.S. Application Data

(60) Continuation of application No. 10/017,714, filed on Dec. 13, 2001, now Pat. No. 6,587,414, which is a division of application No. 09/413,548, filed on Oct. 6, 1999, now Pat. No. 6,452,884, which is a division of application No. 08/846,097, filed on Apr. 25, 1997, now Pat. No. 6,097,683.

(30) Foreign Application Priority Data

Apr. 26, 1996 (JP) .............................. 8-106614
Aug. 7, 1996 (JP) .............................. 8-208143

(51) Int. Cl.[7] .............................. G11B 5/09
(52) U.S. Cl. .................. 369/47.55; 369/53.2; 369/53.37
(58) Field of Search .......................... 369/47.14, 53.12, 369/53.15, 53.2, 53.37, 53.41, 53.42, 53.45, 47.55, 53.13, 53.21, 291, 275.3, 13.36, 47.1

(56) References Cited

U.S. PATENT DOCUMENTS

| 4,989,195 | A | 1/1991 | Suzuki |
| 5,406,540 | A | 4/1995 | Longman et al. |
| 5,469,418 | A | 11/1995 | Satoh et al. |
| 5,471,351 | A | 11/1995 | Ishiguro |
| 5,689,489 | A | 11/1997 | Shin |
| 5,764,622 | A | 6/1998 | Kawamura et al. |
| 5,936,935 | A | 8/1999 | Hanakawa et al. |
| 5,970,045 | A | 10/1999 | Aoki et al. |
| 6,356,971 | B1 * | 3/2002 | Katz et al. .................. 710/301 |

FOREIGN PATENT DOCUMENTS

| JP | 63-53756 | 3/1988 |
| JP | 02073563 | 3/1990 |

(List continued on next page.)

OTHER PUBLICATIONS

International Search Report dated May 8, 1997 corresponding to PCR/JP97/01371.

(List continued on next page.)

*Primary Examiner*—Paul W. Huber
(74) *Attorney, Agent, or Firm*—RatnerPrestia

(57) ABSTRACT

An information recording method has;
  a history determination step for determining whether or not a medium being cased and capable of being used for information recording and reproduction has previously been taken out from the case by using an identification section having historical information as to whether the medium has previously been taken out from the case or not; and
  a verification step for verifying correctness of information recorded always or on condition that a predetermined condition is satisfied when a result of the determination shows that the medium has previously been taken out from the case.

15 Claims, 24 Drawing Sheets

FOREIGN PATENT DOCUMENTS

| | | |
|---|---|---|
| JP | 5-144165 | 6/1993 |
| JP | 6-150317 | 5/1994 |
| JP | 7-320373 | 12/1995 |
| JP | 09245417 | 9/1997 |

OTHER PUBLICATIONS

European Search Report corresponding to application No. EP 97 917455 dated Nov. 4, 1999.

European Search Report corresponding to application No. EP 99 12 0165 dated Nov. 23, 1999.

European Search Report corresponding to application No. EP 99 12 0162 dated Nov. 23, 1999.

European Search Report corresponding to application No. EP 99 12 0166 dated Nov. 23, 1999.

* cited by examiner

Fig. 17
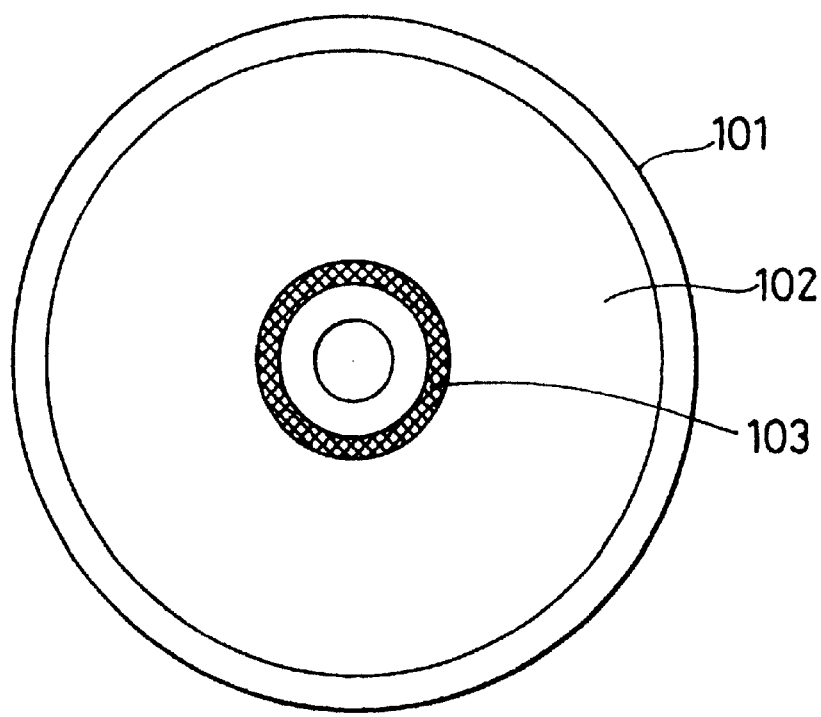
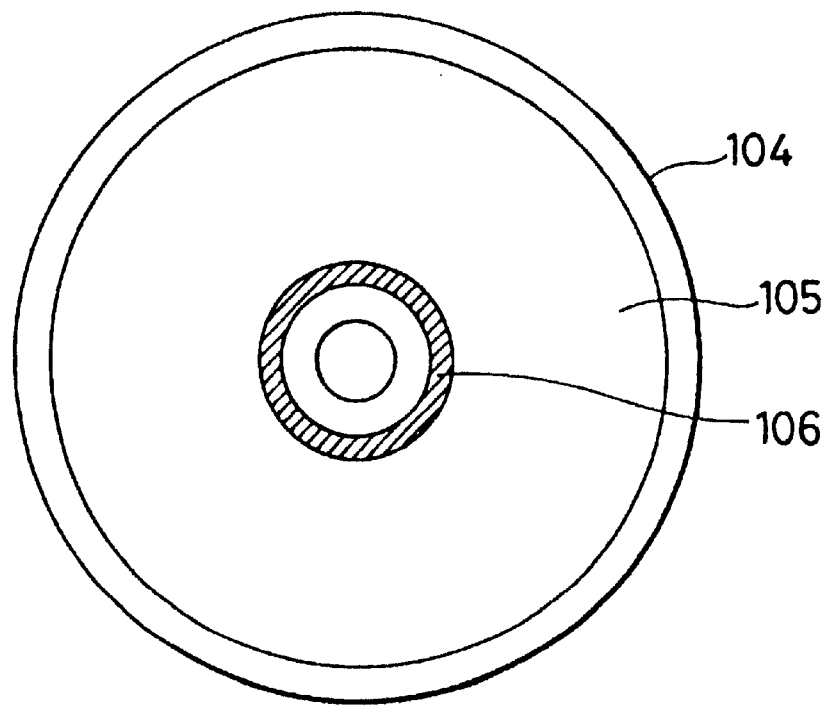

INFORMATION RECORDING METHOD, INFORMATION RECORDING/REPRODUCING APPARATUS, AND INFORMATION RECORDING MEDIUM

This application is a continuation of U.S. patent application Ser. No. 10/017,714, filed Dec. 13, 2001, now U.S. Pat. No. 6,587,414, which is a divisional of U.S. patent application Ser. No. 09/413,548, filed Oct. 6, 1999, now U.S. Pat. No. 6,452,884, which is a divisional of U.S. patent application Ser. No. 08/846,097, filed Apr. 25, 1997, now U.S. Pat. No. 6,097,683.

BACKGROUND OF THE INVENTION

1. Field of the Invention

The present invention relates to an information recording method, an information recording apparatus, and an information recording medium.

2. Related Art of the Invention

In recent years, with an increase in capacity of information apparatuses such as computers, optical disks have been receiving greater attention as recording media.

Hereinafter, a conventional optical disk cartridge will be described with reference to the drawings. FIG. 14 is a plan view of a conventional optical disk cartridge.

As shown in FIG. 14, an optical disk 201 is a recording medium capable of being used for information recording and reproduction. A case 202 is provided for housing the optical disk 201 therein to protect it from dirt such as dust and fingerprints. A window 203 is provided on the case 202 for enabling information recording and reproduction onto and from the optical disk 201 when the optical disk 201 is mounted in an information recording/reproducing apparatus. Normally, the window 203 is closed by a slide shutter. Here we call such case in which the optical disk is stored, as a cartridge 204.

Generally in an optical disk 201 which is capable of recording/reproducing, if the surface is blemished by fingerprints or duet, the power applied from the semiconductor laser to the recording surface becomes lower than an appropriate value, so that the reliability of recording markedly degrades.

To avoid the degradation of the reliability, the recording/reproducing optical disk 201 described with reference to FIG. 14, such as an International Organization for Standardization (ISO) data file and a mini disk (MD), is cased as described above.

Subsequently, a reproduction-only-type optical disk (not shown) such as a compact disk (CD) and a laser disk (LD) will be described.

Unlike the disk described with reference to FIG. 14, the reproduction-only-type optical disk, on which information is never written by the user, is directly mounted in a reproducing apparatus for reproduction without being cased. This type of reproducing apparatus is capable of reproduction only from optical disks not being cased.

Consequently, a problem arises that the reproducing apparatus designed for reproduction only from reproduction-only-type optical disks is incapable of reproduction from the recording/reproduction-type optical disk 201 shown in FIG. 14 since the optical disk 201 is stored in the case 202.

To solve this problem, a cartridge 214 structured as shown in FIGS. 15(a) and 15(b) has been devised. FIG. 15(a) is a plan view showing a condition where the optical disk 201 is housed in a case 212. FIG. 15(b) is a plan view showing a condition where the optical disk 201 is being taken out from the case 212.

As shown in FIGS. 15(a) and 15(b), the case 212 is provided for housing the optical disk 201 therein and has a window 203 used for recording and reproduction. Over the window 203, a slide shutter 213 is provided. An opening/closing door 211 pivotably provided at an opening formed at an end of the case 212 is used for taking out the optical disk 201 from the case 212.

The cartridge 214 thus structured is mountable in reproduction-only-type apparatuses because the optical disk 201 can be taken out from the case 212 by opening the door 111.

In this way, reproduction from the cased recording/reproduction-type optical disk 201 can be performed by using reproducing apparatuses capable of reproduction from reproduction-only-type optical disks.

On the other hand, a recording/reproducing system called a jukebox 223 is known where a plurality of recording/reproduction-type optical disks 201 are housed in a stocker 221 without being cased and a recording/reproducing section 222 performs recording and reproduction onto and from the optical disks 201 (see FIG. 16).

In the jukebox 223, since the optical disks 201, which are factory-mounted in the stocker 221, are never touched by the user, the surfaces of the optical disks 201 are hardly blemished by scratches or fingerprints.

Additionally, in the jukebox 223, aside from the optical disks 201 factory-mounted in the stocker 221, the user may mount for recording and reproduction in the optical disk 201 taken out from the cartridge 214 as shown in FIG. 15.

Thus, the cased recording/reproduction-type optical disk shown in FIG. 15 may be used for the jukebox 223 structured as described above.

However, the following problems are faced by the conventional recording/reproduction-type optical disk from which information can be reproduced by using reproducing apparatuses capable of reproduction only from reproduction-only-type optical disks:

One problem is that once the optical disk 201 is taken out from the case 212, the disk surface is blemished by fingerprints, dust or scratches, so that when the disk 201 is again housed in the case 212 and mounted in a recording/reproducing apparatus for recording, the reliability of the recorded data is markedly degraded because of the blemishes such as fingerprints on the disk surface.

Another problem is that when the conventional recording/reproduction-type optical disk is used in the jukebox 223, the optical disk mounted in the stocker 221 by the user can be blemished, whereas the disks factory-mounted in the stocker 221 are never blemished, so that the levels of reliability of the recorded data differ between the former and latter disks.

An object of the present invention is, in view of the problems of the conventional apparatus, to provide an information recording method, an information recording apparatus and an information recording medium with which the reliability of the recorded data is ever more improved.

On the other hand, while in general, the optical disk capable of being used for information recording and reproduction cannot be used for recording when taken out from the case because its surface is blemished by dust or fingerprints, a special recording/reproducing optical disk, for example, having its surface processed so as not to be readily blemished has been devised.

Moreover, the types of the case include a type from which the optical disk cannot be taken out as shown in FIG. 14 and a type from which the optical disk can be taken out.

Thus, there are two types of optical disks: a type which can be used for recording even when taken out from the case and a type which produces poor results in recording when taken out from the case, and there are two types of cases: a type from which the disk cannot be taken out and a type from which the disk can be taken out.

As the recording/reproducing apparatus, an apparatus is desired capable of recording and reproduction onto and from both cased disks and bare disks.

An object of a recording method of an information recording/reproducing apparatus of the present invention is to provide a recording method for performing appropriate recording by identifying the types of the disks and cases.

SUMMARY OF THE INVENTION

The Information recording method of the present invention comprises:
  a history determination step for determining whether or not a medium being cased and capable of being used for information recording and reproduction has previously been taken out from the case by using an identification section having historical information as to whether the medium has previously been taken out from the case or not; and
  a verification step for verifying correctness of information recorded always or on condition that a predetermined condition is satisfied when a result of the determination shows that the medium has previously been taken out from the case.

An information recording apparatus of the present invention comprises:
  history determining means for determining whether or not a medium being cased and capable of being used for information recording and reproduction has previously been taken out from the case by using an identification section having historical information as to whether the medium has previously been taken out from the case or not; and
  verifying means for verifying correctness of information recorded always or on condition that a predetermined condition is satisfied when a result of the determination shows that the medium has previously been taken out from the case.

An information recording apparatus of the present invention comprises:
  a stocker for housing therein a predetermined number of media without being cased; and
  means for recording information onto the media by using the stocker,
  wherein said media includes a medium factory-mounted in the stocker and a medium mounted in the stocker from outside the stocker, and said media each have a data area for writing thereon data to be recorded and a management area for writing thereon management information as to whether the medium has previously been outside the stocker or not.

An information recording medium of the present invention comprises a management area for writing thereon management information to determine whether a medium capable of being used for information recording and reproduction is a medium used without being cased or a medium used being cased.

A recording method of the present invention of an information recording/reproducing apparatus for a first information recording/reproducing medium which is necessarily cased and a second information recording/reproducing medium which is not necessarily cased, said information recording/reproducing apparatus being capable of handling the information recording/reproducing media both when they are not being cased and when they are being cased,
  wherein said information recording/reproducing media each have a medium identifying information section indicating whether the medium is the first information recording/reproducing medium which is necessarily cased or the second information recording/reproducing medium which is not necessarily cased,
  wherein said case has a case presence/absence information section indicating whether the case is present or absent, and
  wherein said information recording/reproducing apparatus recognizes a combination of the kind of the information recording/reproducing medium and the presence or absence of the case by using first detecting means for detecting the contents of the medium identifying information section and second detecting means for detecting the contents of the case presence/absence information section, said information recording/reproducing apparatus changing a recording mode based on a result of the recognition to record information onto the information recording/reproducing medium or perform after-defect-inspection recording or inhibit recording of information.

An information recording/reproducing apparatus of the present invention is for a first information recording/reproducing medium which is necessarily cased and a second information recording/reproducing medium which is not necessarily cased, said information recording/reproducing apparatus being capable of handling the information recording/reproducing media both when they are not being cased and when they are being cased,
  wherein said information recording/reproducing media each have a medium identifying information section for indicating whether the medium is the first information recording/reproducing medium which is necessarily cased or the second information recording/reproducing medium which is not necessarily cased,
  wherein said case has a case presence/absence information section for indicating whether the case is present or absent, and
  wherein said information recording/reproducing apparatus has first detecting means for detecting the contents of the medium identifying information section and second detecting means for detecting the contents of the case presence/absence information section, and recognizes a combination of the kind of the information recording/reproducing medium and the presence or absence of the case, said information recording/reproducing apparatus changing a recording mode based on a result of the recognition to record information onto the information recording/reproducing medium or perform after-defect-inspection recording or inhibit recording of information.

Information recording method of the present invention for;
  determining whether or not a medium being cased and capable of being used for information recording and reproducing, has previously been taken out from the case by using an identification section having historical information as to whether the medium has previously been taken out from the case or not; and
  when a result of the determination shows that the medium has previously been taken out from the case, for verifying correctness of information after recorded or recording after verification of correctness of information always or on condition that a predetermined condition is satisfied, or inhibiting the recording, if the medium is a first recording/reproducing information medium that is required to use a case at recording, and for recording normally if the medium is a second recording/reproducing information medium that is not required to use a case at recording.

Information recording apparatus of the present invention comprises;

history determination means for determining whether or not medium being cased and capable of being used for information recording and reproducing, has previously been taken out from the case by using an identification section having historical information as to whether the medium has previously been taken out from the case or not; and means, when a result of the determination shows that the medium has previously been taken out form the case, for verifying correctness of information after recorded or recording after verification of correctness of information always or on condition that a predetermined condition is satisfied, or inhibiting the recording, if the medium is a first recording/reproducing information medium that is required to use a case at recording, and for recording normally if the medium is a second recording/reproducing information medium that is not required to use a case at recording.

Information recording medium of the present invention comprises; a medium identifying information area for showing whether a medium is required to be recorded with using a case or not.

BRIEF DESCRIPTION OF THE DRAWINGS

FIG. 17 shows a recording/reproducing optical disk as an information recording/reproducing medium according to an embodiment of the present invention;

| [Description of the Reference Designations] | |
|---|---|
| 1 | Optical disk |
| 2 | Case |
| 3 | Identification section |
| 4 | Optical disk |
| 5 | Recording/reproducing apparatus |
| 6 | Reproduction-only-type apparatus |
| 10 | Window |
| 11 | Shutter |
| 12 | Engagement hole |
| 13 | Confirmation hole |
| 14 | Opening/closing door |
| 15 | Hinge |
| 16 | End |
| 17 | Opening |
| 31 | History determining means |

-continued

[Description of the Reference Designations]

| | |
|---|---|
| 32 | Display |
| 33 | Selective direction means |
| 34 | Verifying means |
| 35 | Recording means |
| 36 | Terminating means |
| 53 | Disk management area |
| 71 | Read-in area |
| 72 | Data area |
| 73 | Readout area |
| 74 | User area |
| 101 | First optical disk |
| 103 | First optical disk identification code |
| 104 | Second optical disk |
| 106 | Second optical disk identification code |
| 107 | First case |
| 111 | First case identification hole |
| 112 | Second case |
| 114 | Second case identification hole |
| 116 | Turntable |
| 117 | Optical pickup |
| 120 | Case detecting switch |
| 121 | Case identifying switch |

DESCRIPTION OF THE PREFERRED EMBODIMENTS

The entire disclosure of U.S. patent application 08/846,097, filed Apr. 25, 1997 is expressly incorporated by reference herein.

Figure 1:
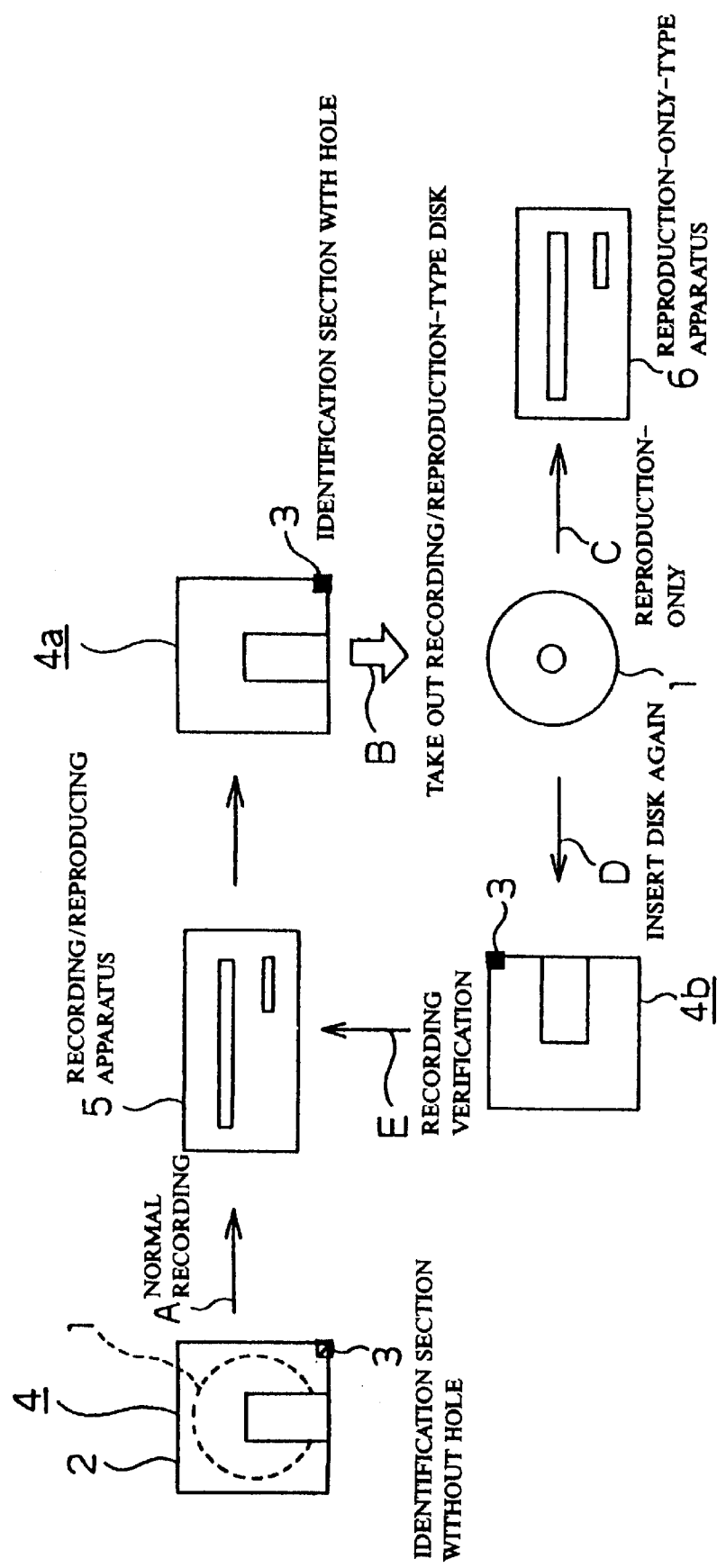
FIG. 1 is a schematic view for outlining a relationship among an information recording method, an information recording apparatus and an information recording medium according to an embodiment of the present invention.

FIG. 1 is a schematic view for outlining a relationship among an information recording method, an information recording apparatus and an information recording medium according to an embodiment of the present invention. The embodiment will be outlined with reference to the figure.

(1) In FIG. 1, an optical disk (hereinafter abridged as disk) 1 as a medium of the present invention is a medium capable of being used for information recording and reproduction and is housed in a case 2. At a part of the case 2, an opening/closing door (see FIG. 3) is provided for taking out the disk 1, and an identification section 3 is provided for recording thereon historical information as to whether the disk 1 has been taken out or not. These members constitute a cartridge 4. The detailed structure of the cartridge 4 will be described later.

A recording/reproducing apparatus 5 as an information recording apparatus of the present invention is an apparatus for recording and reproduction onto and from the optical disk 1 being cased. The detailed structure of the apparatus 5 will be described later. A reproduction-only-type apparatus 6 is an apparatus for reproduction from disks not being cased.

A cartridge 4a represents a condition where the case 2 is empty with the disk 1 having been taken out from the cartridge 4. A cartridge 4b represents a condition where the disk 1 previously taken out is again housed in the case 2.

With respect to the arrangement described above, the general flow of an operation will be described with reference to FIG. 1.

While the user is performing normal recording by using the cartridge 4 as shown by the arrow A of FIG. 1, the surface of the disk 1 is never blemished. In the case of the normal recording shown by the arrow A, the identification section 3 maintains its initial configuration which is similar to that at the time of shipment from the factory. When the cartridge 4 is used for the reproduction-only-type apparatus 6, however, the disk 1 is taken out from the case 2 (see the arrow B of FIG. 1) before mounted in the reproduction-only-type apparatus 6 (see the arrow C of FIG. 1). When the user takes out the disk 1 from the case 2, the opening/closing door does not open unless a protrusion of the identification section 3 is removed, so that a trace indicating that the disk 1 has previously been taken out is left in the identification section 3. Consequently, even though the disk 1 is returned to the case 2 as shown by the arrow D, the cartridge 4b is different from the original cartridge 4 because historical information indicating that the disk 1 has previously been taken out is added to the identification section 3.

According to the embodiment, when such a cartridge 4b is mounted in the recording/reproducing apparatus 5 for recording, the historical information added to the identification section 3 is detected, so that the reliability of the recorded information is improved. For example, in the recording/reproducing apparatus according to the embodiment, when it is sensed based on the identification section that the disk 1 has previously been taken out from the case 2, the contents are displayed. Then, in accordance with the user's direction, whether the information recorded just now is correctly recorded or not is verified. When it is determined that the information is not correctly recorded, the same information is recorded again.

(2) Finishing the outlining of the embodiment, a detailed description thereof will be provided.

FIGS. 2 to 5 show the structure of the cartridge 4 used for the embodiment. The structure of the cartridge 4 will be described with reference to these figures.

Figure 2:
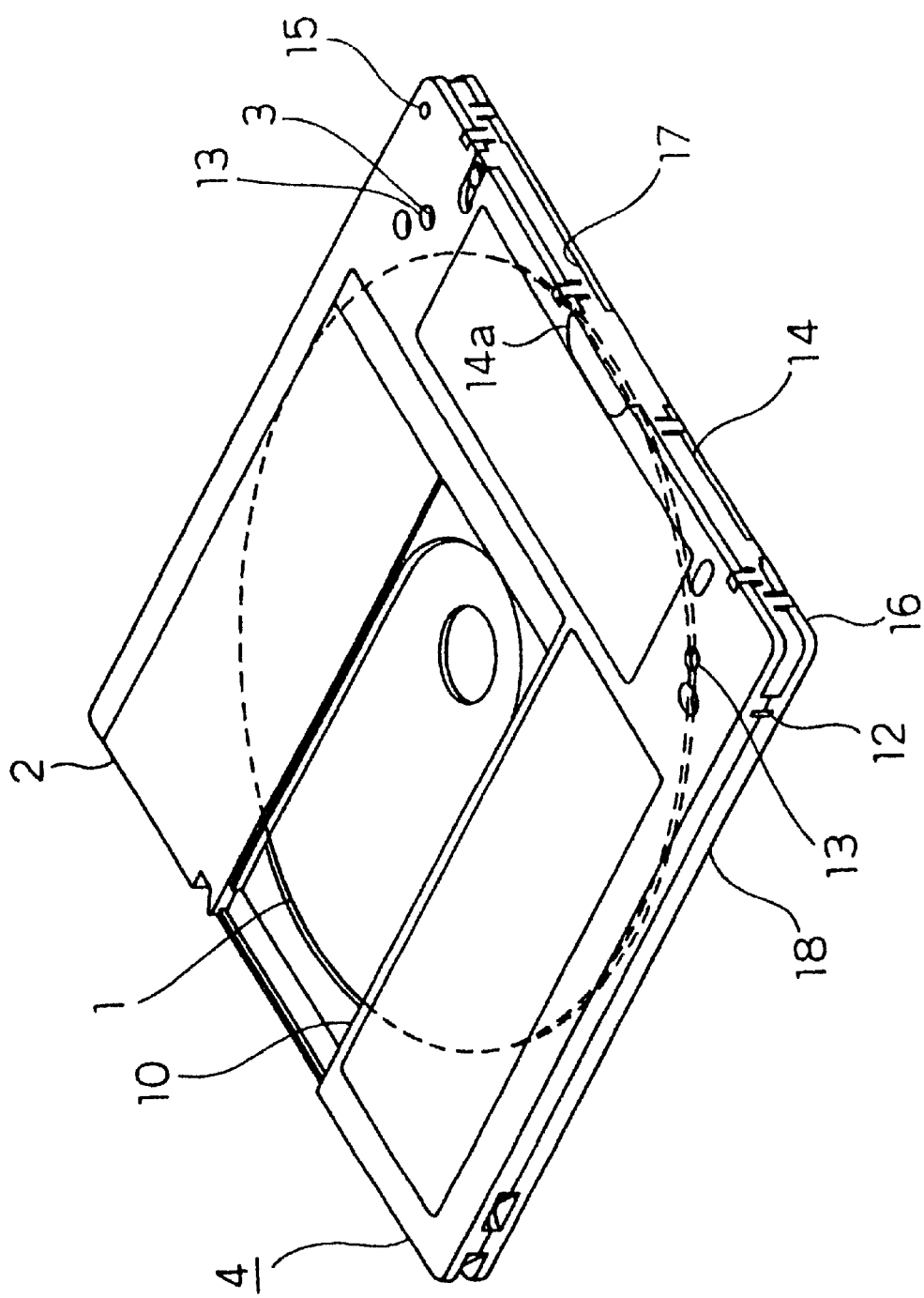
FIG. 2 is an external perspective view of an optical disk according to the embodiment.

FIG. 2 is an external perspective view of the cartridge 4. Similar members to those described with reference to FIG. 1 are denoted by the same reference designations and will not be described.

In the figure, a window 10 is a window provided on the case 2 for enabling information recording and reproduction when the disk 1 is mounted in the information recording/reproducing apparatus 5. Normally, the window 10 is closed by a slide shutter 11 (see FIG. 3). The slide shutter 11 is not shown in FIG. 2 for ease of understanding of the structure of the window 10. An opening 17 is provided at an end 16 of the case 2 for taking out the disk 1 from the case 2. An opening/closing door 14 is pivotably attached by a hinge 15 to close the opening 17. An engagement hole 12 is a slit provided at an end 18 of the case and engages with a subsequently-described claw 19 (see FIG. 4) provided at the opening/closing door 14. The case of the present invention comprises the case 2 and the opening/closing door 14.

Figure 3:
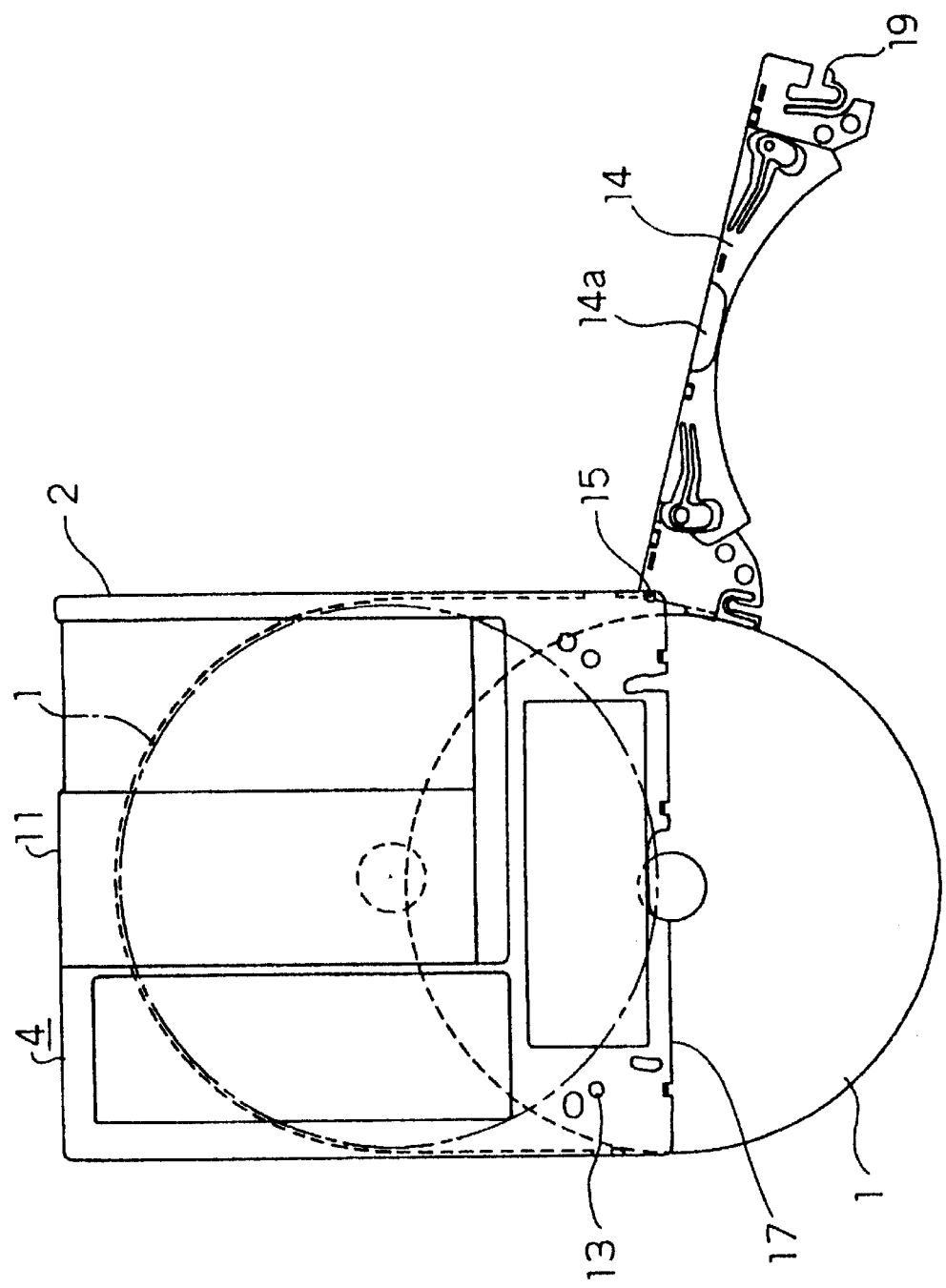
FIG. 3 is a plan view showing a condition where an opening/closing door of the optical disk according to the embodiment is opened.
Figure 4:
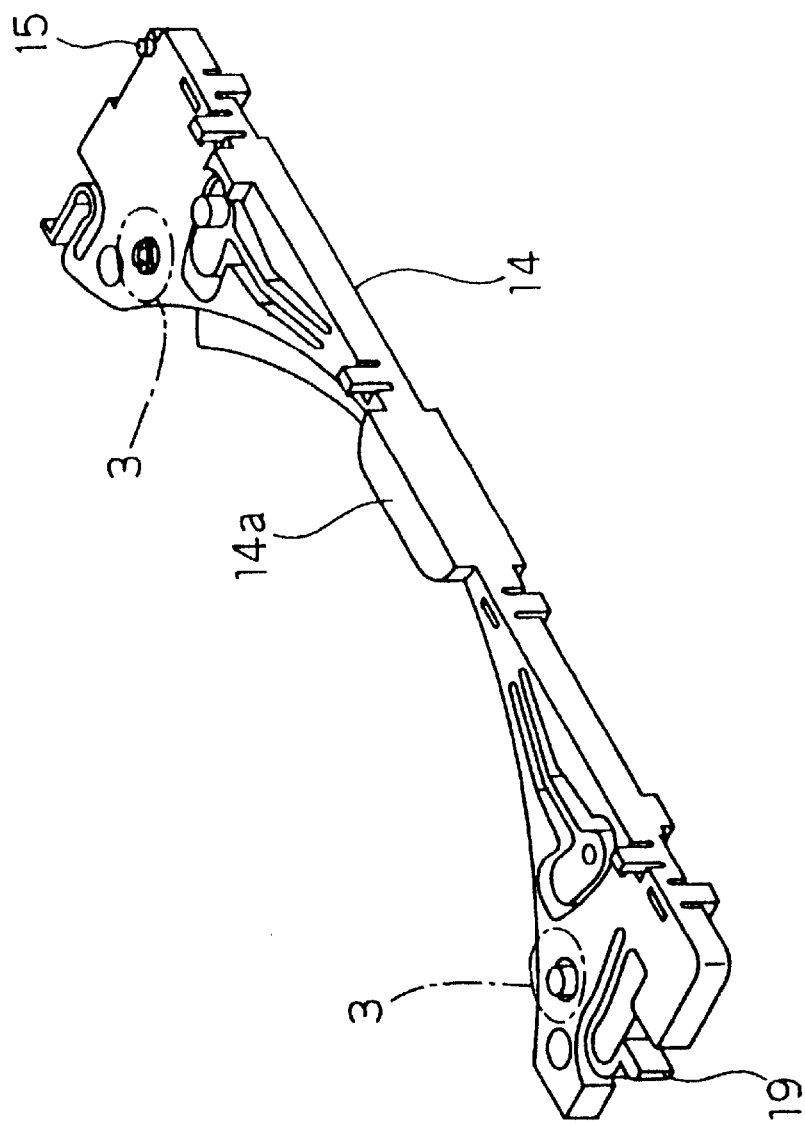
FIG. 4 is an external perspective view of the opening/closing door of the optical disk according to the embodiment.

FIG. 2 shows a condition where the opening/closing door 14 closes the opening 17. A condition where the opening/closing door 14 is opened is shown in FIG. 3. FIG. 4 is a perspective view of the opening/closing door 14.

Figure 5:
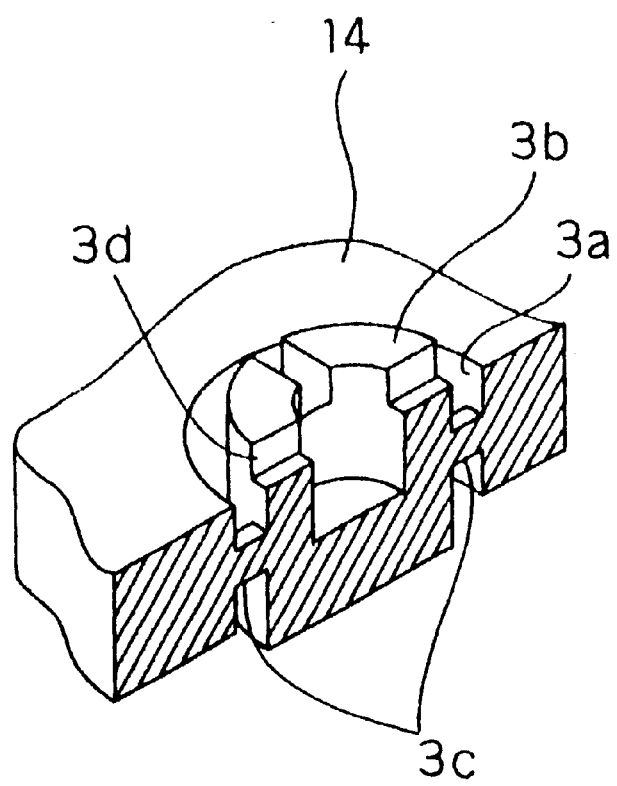
FIG. 5 is an enlarged perspective sectional view of an identification section of the optical disk according to the embodiment.

As shown in FIG. 4, the opening/closing door 14 is a substantially rectangular plate-form member. The near side of the figure corresponds to the end 16 of the case 2 and is formed to be plane. The far side of the figure is the surface which faces the disk 1 when the opening/closing door 14 is closed. The surface is curved in accordance with the outside shape of the disk 1. The thickness of the opening/closing door 14 corresponds to the height (a portion corresponding to the thickness of the case 2) of the opening 17. The claw 19 is a resilient plate-form protrusion provided at an end surface along the width of the opening/closing door 14. When the opening 17 is closed by the opening/closing door 14, the tip of the claw 19 is engaged with the engagement hole 12 of the case 2. The engagement is released by pushing the tip of the claw 19 toward the far side. The identification section 3 is provided for recording thereon historical information as to whether the disk 1 has previously been taken out from the case 2 or not. There are provided two identification sections 3, one at each end along the length of the opening/closing door 14. FIG. 5 is an enlarged perspective sectional view of the identification section 3.

As shown in FIG. 5, the identification section 3 includes an identification hole 3a formed in the opening/closing door 14, an identification member 3b provided through the identification hole 3a with a predetermined gap therewith, and a support member 3c for partly connecting the identification member 3b to the inner wall of the identification hole 3a. As shown in the figure, the identification member 3b is substantially cylindrical and at an end surface thereof on the upper side of the figure, a cross-shaped recess 3d is formed for admission of the bit of a Phillips screwdriver. The case 2 has four confirmation holes 13 (see FIG. 2), two in opposite positions on each surface. The confirmation holes 13 are provided in positions corresponding to the positions of the identification sections 3 for allowing the admission of a Phillips screwdriver when the opening/closing door 14 is closed.

With respect to the arrangement described above, an operation to take out the disk 1 from the case 2 will be described with reference to FIGS. 1 to 5.

The general flow of the operation performed by the user to use the cartridge 4 is as described with reference to FIG. 1. The following description will concentrate on the operation associated with the identification section 3 explained with reference to the arrows B and D of FIG. 1.

(a) First, to take out the disk 1 from the case 2, the user inserts the screwdriver into the confirmation hole 13 shown in FIG. 2 to engage the bit of the screwdriver with the recess 3d (see FIG. 5) and lightly turns the screwdriver. At this time, the support member 3c is cut by the turning effort, so that the identification member 3b is separated from the identification section 3 and falls out of the case 2 through the confirmation hole 13 formed on the opposite side of the case 2.

(b) A similar operation is performed for the other identification section 3.

(c) Then, the user inserts a flat-blade screwdriver into the engagement hole 12 of the case 2 and pinches a knob 14a formed in the center of the opening/closing door 14 to pull it outward while pushing the tip of the claw 19 toward the far side. Thereby, the opening/closing door 14 is opened as shown in FIG. 3.

(d) With the opening/closing door 14 completely opened, the user slides the disk 1 to take it out of the case 2.

Thus, by the identification member 3b of the identification section 3 being removed, historical information indicating that the disk 1 has previously been taken out is left as a trace on the case 2.

Therefore, in FIG. 1, as described with reference to the arrow D, even though the disk 1 is returned to the case 2, the historical information indicating that the disk 1 has previously been taken out is left on the identification section 3. The historical information is detected by a subsequently-described recording/reproducing 5 and used in recording.

Figure 6:
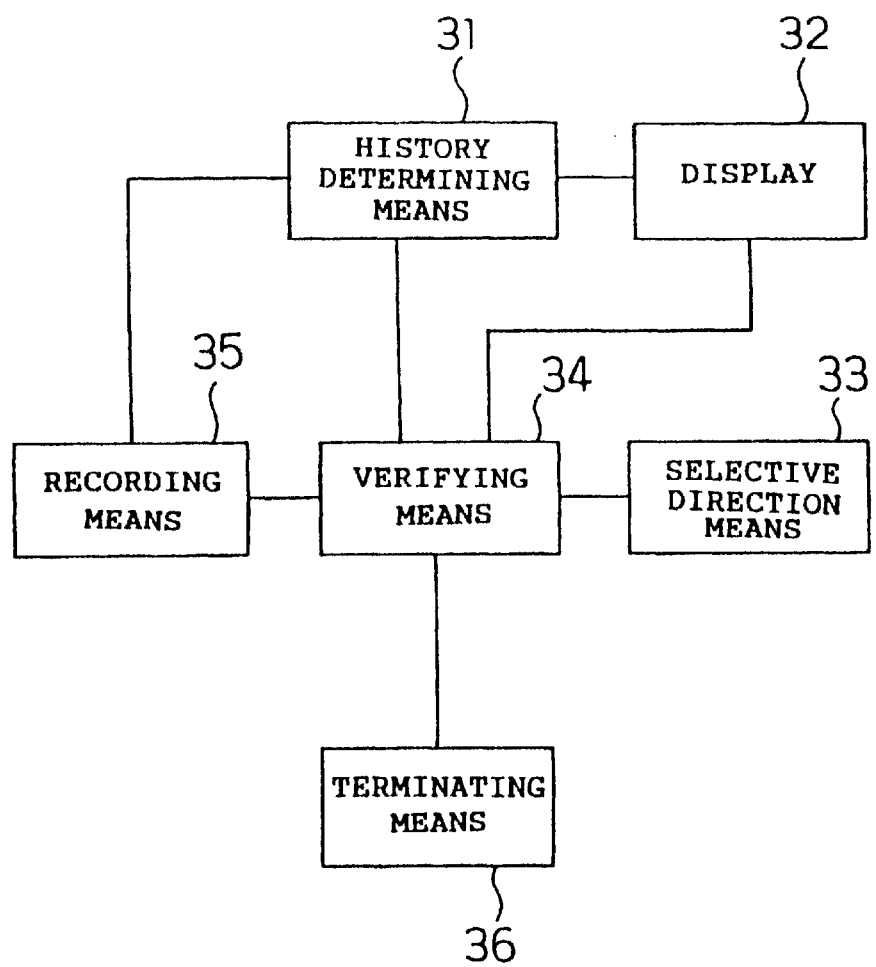
FIG. 6 is a block diagram showing the structure of a recording/reproducing apparatus according to the embodiment.

(3) Finishing the description of the cartridge 4, the structure of the recording/reproducing apparatus 5 will be described with reference to FIG. 6 which is a block diagram showing the structure of the recording/reproducing apparatus 5.

In the figure, a history determining means 31 detects the condition of the identification section 3 of the cartridge 4 with a subsequently-described detecting means to determine whether the disk 1 has previously been taken out from the case or not, and outputs the result of the determination onto a subsequently-described display 32. The display 32 receives the determination result from the history determining means 31 and according to the result, displays a message to confirm the user's intention as to whether a subsequently-described verification is performed or not and the result of the verification. A selective direction means 33 accepts the user's direction as to whether the verification is performed or not and outputs the direction to a verifying means 34. The verifying means 34 verifies the correctness of the information recorded by a subsequently-described recording means 35 according to the direction from the selective direction means 33 and outputs the result of the verification. The verifying means 34 includes an error correcting circuit. The recording means 35 performs not only normal recording but also re-recording according to the verification result from the verifying means 34. A terminating means 36 terminates recording when the verification result from the verifying means 34 shows that the information is correctly recorded.

The verification result showing that the information is correctly recorded includes the following: a case where there are no errors compared with the original information, a case where there are errors but they are all correctable, and a case where there are errors which are uncorrectable but the number of the uncorrectable errors is within a predetermined range.

Figure 7A:
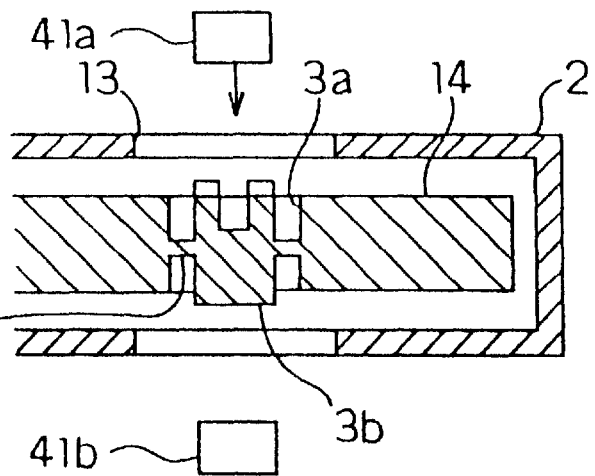
FIG. 7(a) is a schematic sectional view showing a condition where an identification member is present in the identification section according to the embodiment.
Figure 7B:
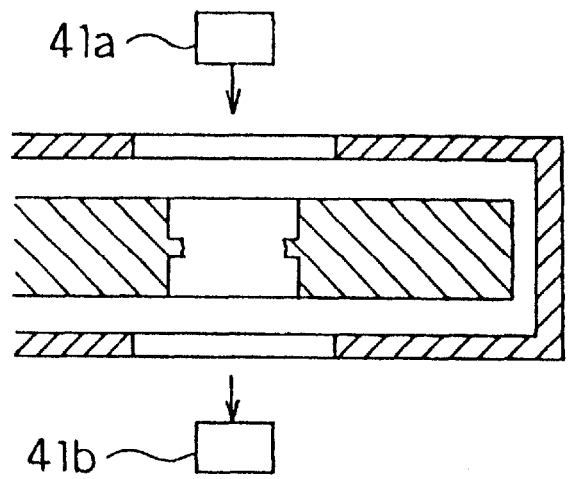
FIG. 7(b) is a schematic sectional view showing a condition where the identification member is absent in the identification section according to the embodiment.

Subsequently, the structure of the detecting means in the history determining means 31 will be described with reference to FIGS. 7(a) and 7(b). A light emitting device 41a and a light receiving device 41b for detecting the presence or absence of the identification member 3b are disposed to be opposite to each other with the case 2 therebetween in positions corresponding to the positions of the identification member 3b of the optical disk 4 mounted in the recording/reproducing apparatus 5. FIG. 7(a) shows a condition where the identification member 3b is present. FIG. 7(b) shows a condition where the identification member 3b is absent. The light receiving device 41b can receive light from the light emitting device 41a only in the case of FIG. 7(b).

Figure 8:
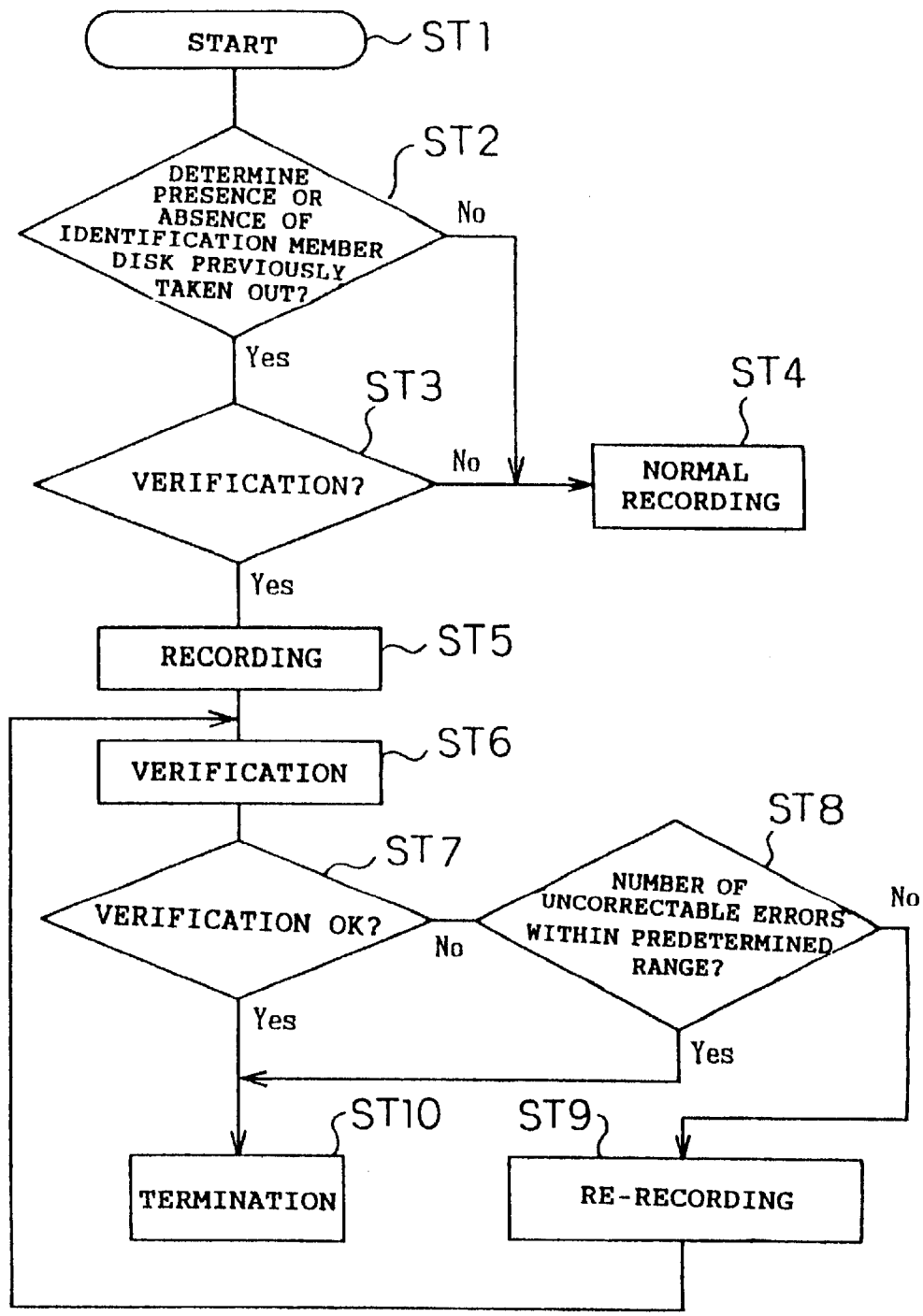
FIG. 8 is a flowchart for explaining an operation of the recording/reproducing apparatus according to the embodiment and an information recording method.

With respect to the arrangement described above, an operation of the recording/reproducing apparatus 5 according to the embodiment will be described with reference to the drawings and an information recording method as an embodiment of the present invention will simultaneously be described. FIG. 8 is a flowchart for explaining the operation of the recording/reproducing apparatus according to the embodiment and the information recording method.

The following description will concentrate on the operation shown by the arrow E of FIG. 1

Step 1 (ST1): On the identification section 3 of the cartridge 4b shown in FIG. 1, the historical information indicating that the disk 1 has previously been taken out is left as described above. The cartridge 4b having such historical information is mounted in the recording/reproducing apparatus 5 and a direction is given to perform recording.

Step 2 (ST2): When the direction to perform recording is given, the history determining means 31 detects the presence or absence of the identification member 3b with the light receiving device 41a and the light emitting device 41b (see FIG. 7(b)). In this case, since the identification member 3b has already been removed, it is determined that the disk 1 has previously been taken out from the case 2 and the process proceeds to step 3.

When it is determined that the identification member 3b is present as a result of the detection of the presence or absence of the identification member 3b, the history determining means 31 directs the recording means 35 to perform normal recording. Then, the process proceeds to step 4.

Step 3 (ST3): A message to confirm whether the user verifies the information to be recorded or not is displayed on the display 32. In response to the message, the user inputs a direction as to whether to perform the verification or not with the selective direction means 33. When the user inputs a direction to perform the verification, the verifying means 34 directs the recording means 35 to perform recording with verification and the process proceeds to step 5. When the user inputs a direction not to perform the verification, the verifying means 34 directs the recording means 35 to perform normal recording and the process proceeds to step 4.

Thus, since the user decide whether to perform the verification or not, a problem is solved that the recording speed is reduced by always performing the verification.

Step 4 (ST4): At this step, normal recording is performed by the recording means 35. When recording is completed, the operation is terminated without the verification being performed and the process waits for the next direction from the user.

Step 5 (ST5): The information the user intends to record is recorded by the recording means 35 and the process proceeds to step 6.

Step 6 (ST6): The verifying means 34 verifies the information recorded at step 5.

Specifically, (1) the area recorded just now is reproduced, and (2) simultaneously therewith, the error correcting circuit is actuated to check the number of errors.

Step 7 (ST7): Whether the number of errors checked at step 6 is within a correctable range or not is determined by the verifying means 34. When the number is within the correctable range (verification OK), the terminating means 36 terminates recording (step 10). When the number is beyond the correctable range, the process proceeds to step 8.

Step 8 (ST8): The verifying means 34 checks the number of uncorrectable errors and determines whether the number is within a predetermined range or not. When the number is within the predetermined range, the terminating means 36 terminates recording (step 10). When the number is beyond the predetermined range, the process proceeds to step 9.

Step 9 (ST9): The verifying means 34 directs the recording means 35 to perform recording again onto the same area or a new area, so that the recording means 35 performs re-recording. When the re-recording is completed, the process returns to step 6 to repeat the above-described processing.

Step 10 (ST10): Recording is terminated by the terminating means 36, and a display informing the termination of the recording is provided on the display 32.

The series of operations (steps 5 to 10) performed after recording to verify the recording are also referred to as recording verification.

As described above, according to the embodiment, the reliability of the recorded information is ever more improved.

Subsequently, another embodiment of the present invention will be described with reference to the drawings.

Figure 9:
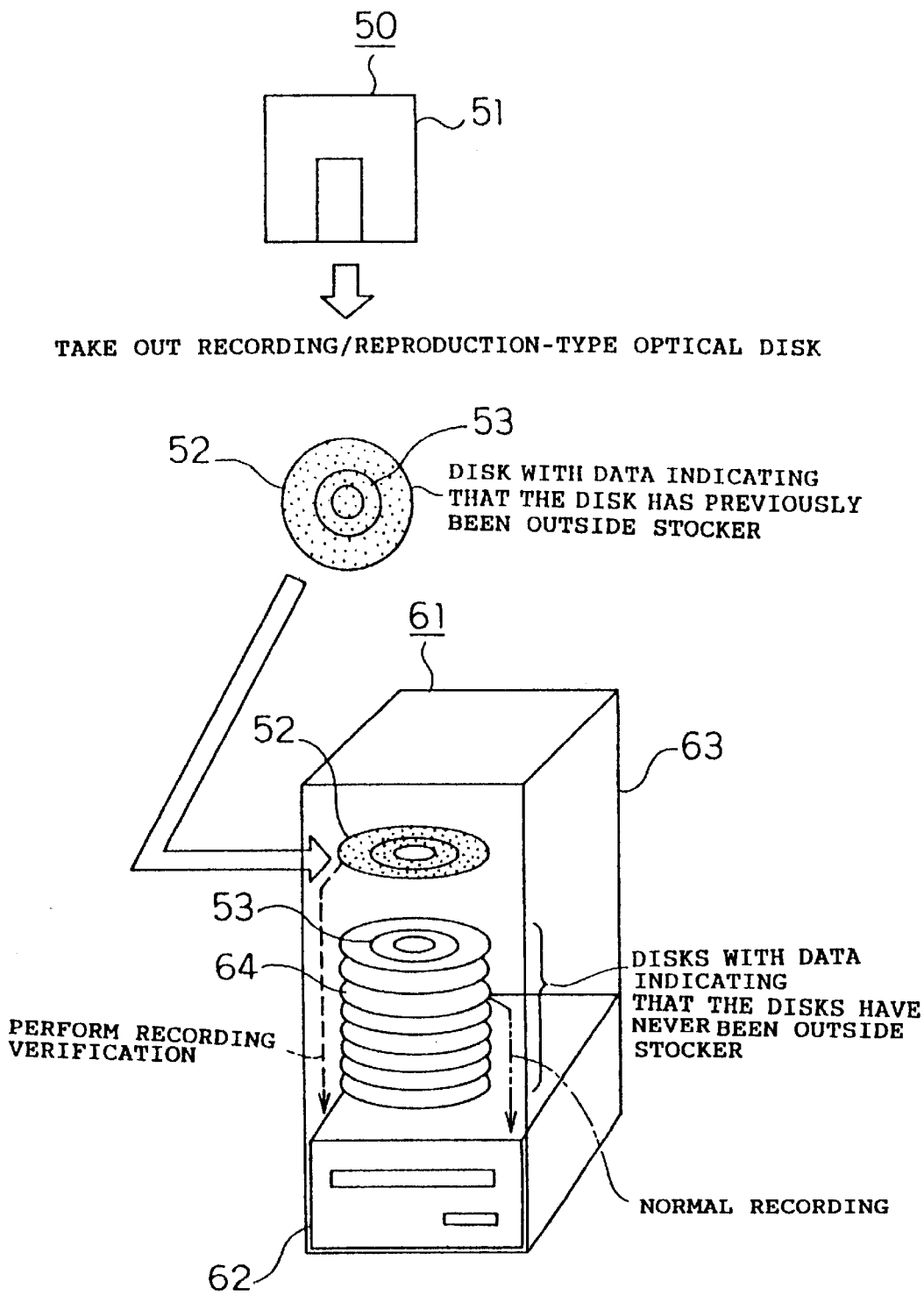
FIG. 9 is a schematic view for outlining a relationship between an information recording apparatus and an information recording medium according to an embodiment of the present invention.
Figure 11:
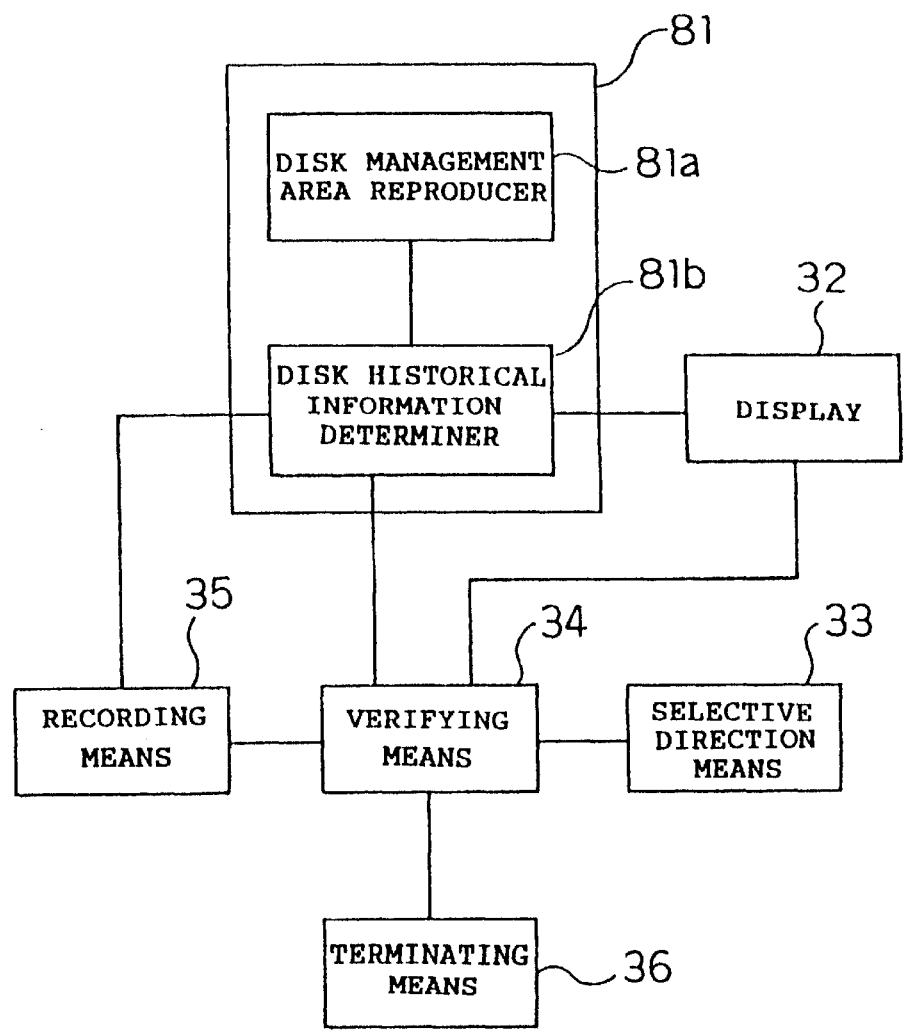
FIG. 11 is a block diagram showing the structure of a recording/reproducing apparatus according to the embodiment.

FIG. 9 is a schematic view for outlining a relationship between an information recording apparatus and an information recording medium according to the embodiment of the present invention. FIG. 11 is a block diagram showing the structure of a recording/reproducing apparatus as the information recording apparatus of the present invention. The structure of the embodiment will be described with reference to these figures.

Figure 15A:
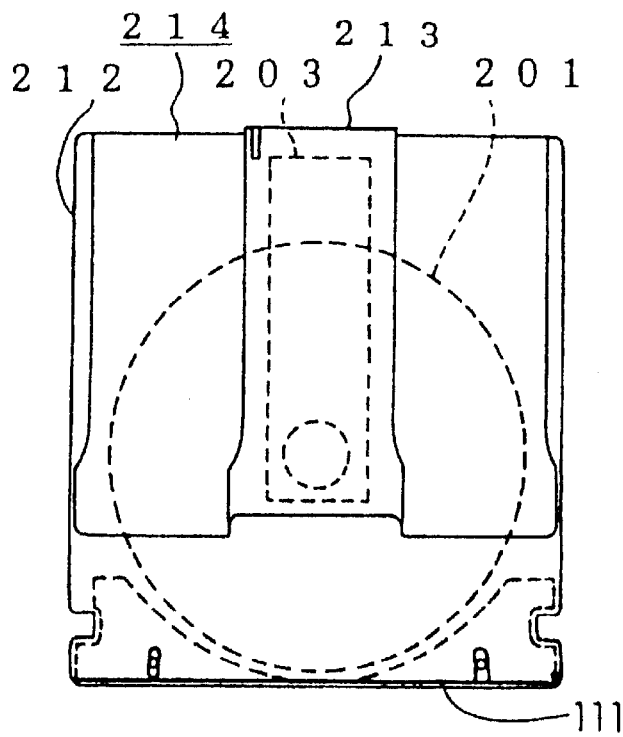
FIG. 15(a) is a plan view showing a condition where a disk is housed in a case.
Figure 15B:
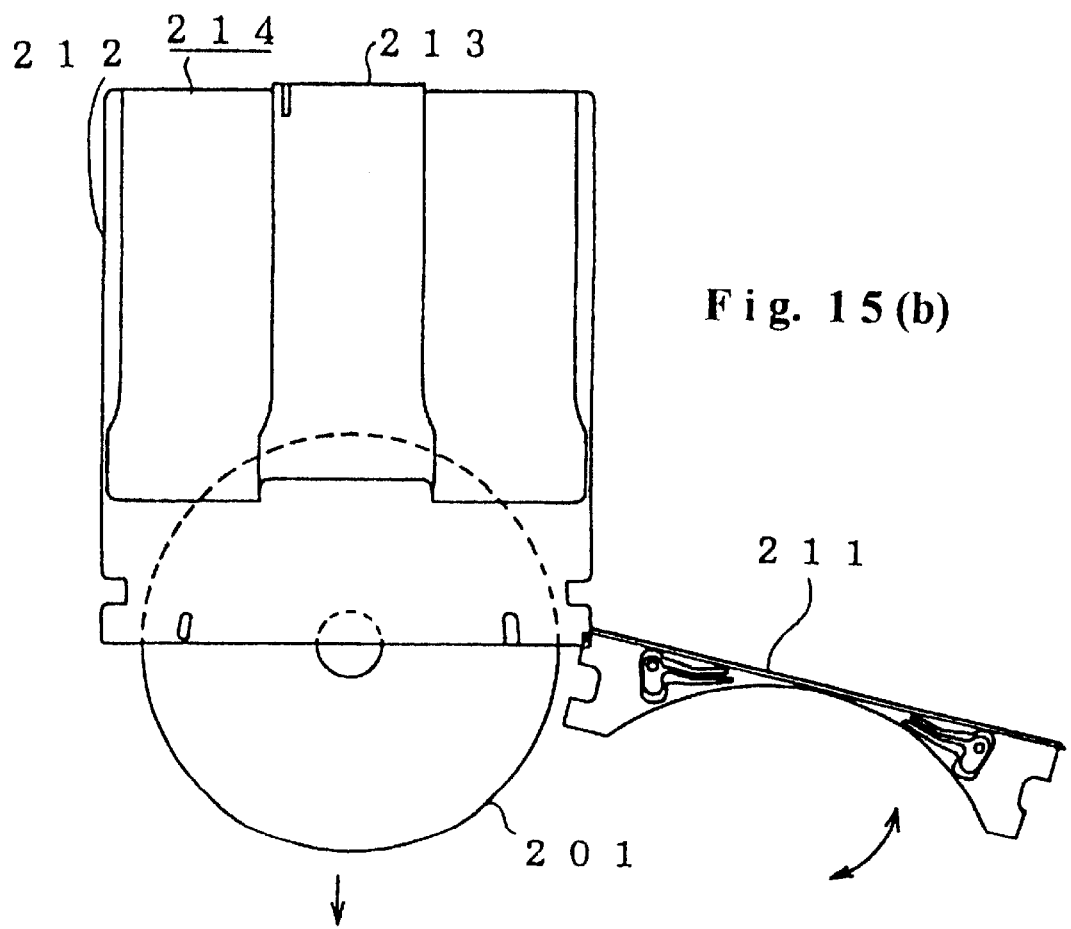
FIG. 15(b) is a plane view showing a condition where the disk is being taken out from the case.

Referring to FIG. 9, a cartridge 51 is designed so that an optical disk (hereinafter abridged as a disk) 52 can be taken out from the case 51 similarly to the cartridge 214 described with reference to FIG. 15.

Figure 16:
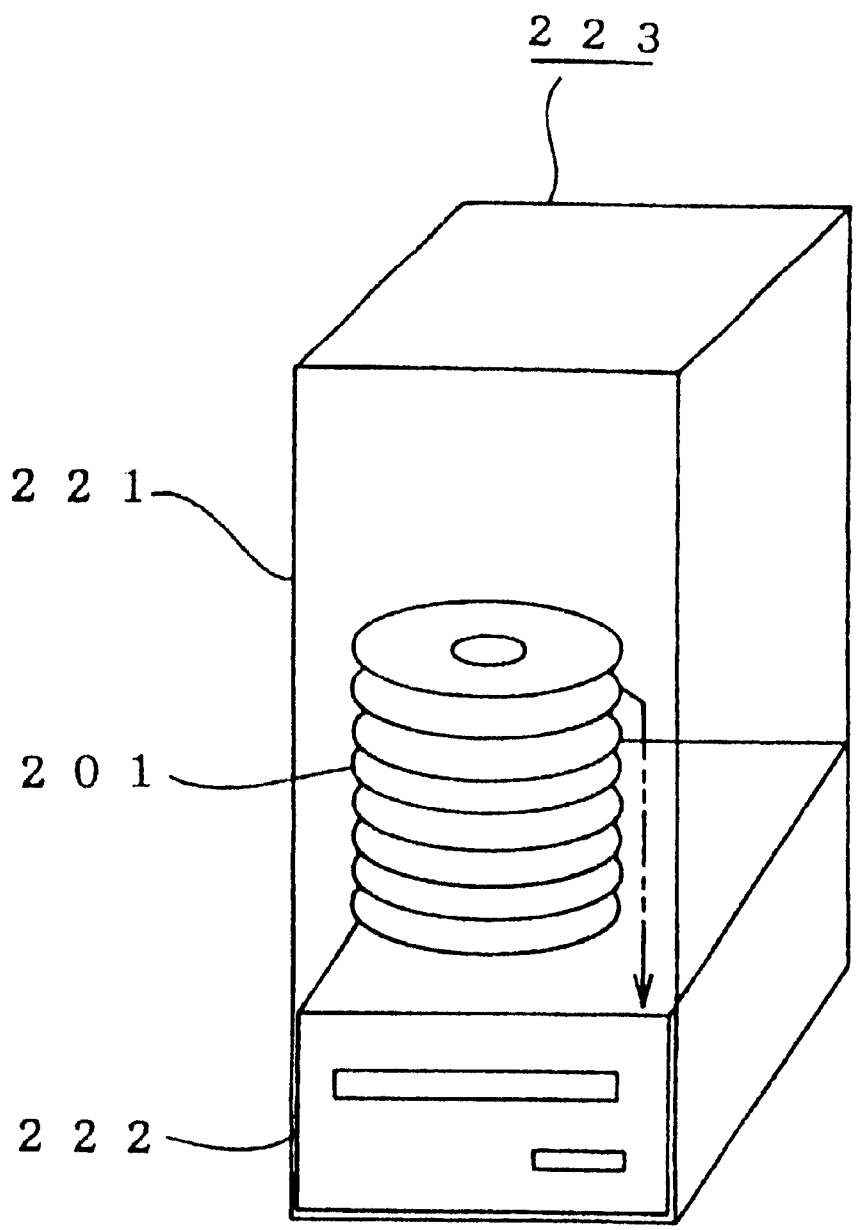
FIG. 16 is a schematic view showing the structure of a conventional jukebox.

A jukebox 61 as the information recording apparatus of the present invention has substantially the same structure as that of the jukebox 223 described with reference to FIG. 16 except the structure of a recording/reproducing apparatus 62 as the recording means of the present invention. A stocker 63 is provided for housing a plurality of bare disks therein and is used in recording and reproduction by the recording/reproducing apparatus 62. Disks (hereinafter abridged as disks) 64 incorporated in the stocker 63 are factory-mounted in the stocker 63 and are never touched by the user. The disk 52 in the stocker 63 is a disk taken out from the case 51 and mounted in the stocker 63 by the user. In FIG. 9, the disk 52 is dotted so that the disk 52 and the disks 64 are clearly distinguished.

Figure 10:
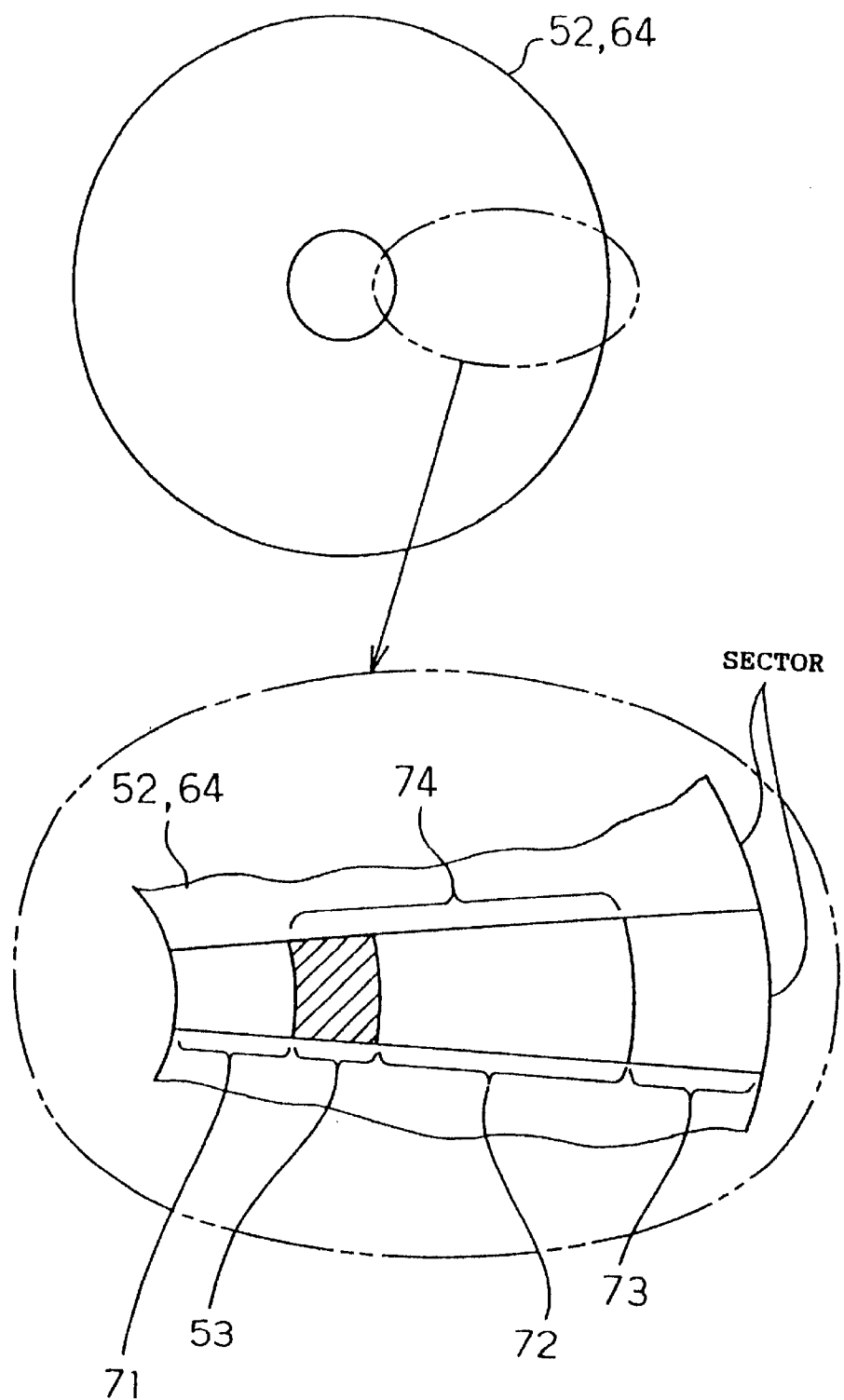
FIG. 10 is a partially enlarged schematic view showing a physical layout of a disk according to the embodiment.

What is important here is that the disks 52 and 64 as the information recording media of the present invention each have a disk management area 53 for writing management information thereon. The disk management area 53 will be described in more detail with reference to FIG. 10 which is a partially enlarged schematic view showing a physical layout of the disk according to the embodiment.

As shown in the figure, on each sector of the disk, a read-in area 71, the disk management area 53, a data area 72 and a readout area 73 are provided in this order from the inner radius to the outer radius. The disk management area 53 and the data area 72 correspond to a user area 74.

On the disk management area 53 of the disk 52, "1" is written as data indicating that the disk has previously been outside the stocker. On the disk management areas 53 of the disks 64, "0" is written as data indicating that the disk has never been outside the stocker. The recording of the data onto the disk managing area 53 will be described later.

Examples of the disks which have previously been outside the stocker include (1) so-called cased disks to be used or having been used for apparatuses such as normal recording/reproducing apparatuses other than the jukebox 61, and (2) so-called non-cased recording/reproduction-type disks which were initially incorporated in the stocker 63 of the jukebox 61 but were taken out and returned to the stocker 63.

Disks, for example, moved between the stocker 63 and the recording/reproducing apparatus 62 in the jukebox 61 are not considered to have been take out of the stocker because they are never touched by the user. Therefore, such disks do not correspond to the disks which have previously been outside the stocker.

Referring now to FIG. 11, the structure of the recording/reproducing apparatus 62 according to the embodiment will be described.

The recording/reproducing apparatus 62 has substantially the same structure as that of the recording/reproducing apparatus 5 described with reference to FIG. 6 except the structure of a history determining means 81. Therefore, common members are denoted by the same reference designations and will not be described.

In FIG. 11, a disk management area reproducer 81a reproduces data written on the disk management area 53 of the disk 52 or 64 set in the recording/reproducing apparatus 62 from the stocker 63. A disk historical information determiner 81b receives the data reproduced by the disk management area reproducer 81a to determine whether the disk has previously been outside the stocker or not, and outputs the result of the determination to the display 32. In this embodiment, the disk management area reproducer 81a and the disk historical information determiner 81*b* constitute the history determining means 81.

Figure 12:
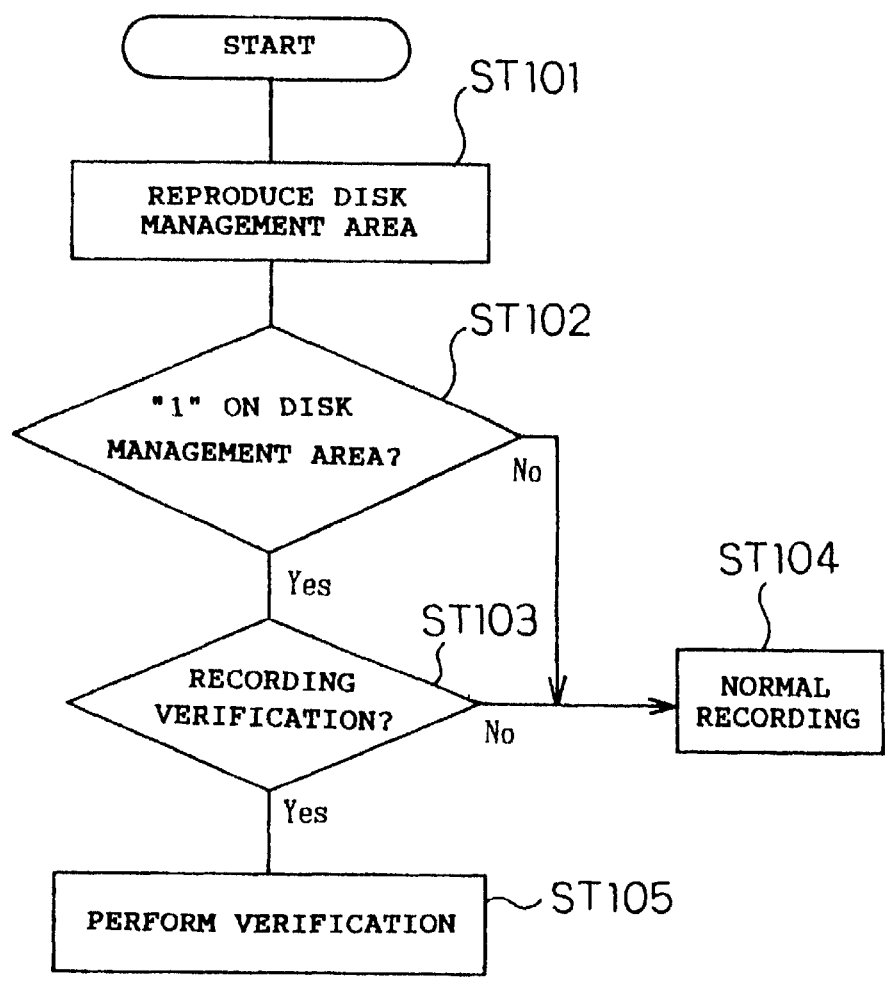
FIG. 12 is a flowchart for explaining an operation of a jukebox according to the embodiment.

With respect to the arrangement described above, an operation of the jukebox 61 according to the embodiment will be described with reference to the drawing. FIG. 12 is a flowchart for explaining the operation of the jukebox 61 according to the embodiment.

Step 101 (ST101): When one disk is selected from among the disks in the stocker 63 shown in FIG. 9 in accordance with the user's direction and the disk is automatically set in the recording/reproducing apparatus 62, the disk management area reproducer 81*a* reproduces the disk management area 53 of the disk.

Step 102 (ST102): The disk historical information determiner 81*b* receives the result of the reproduction to determine whether the data written on the disk management area 53 is "1" or not. When "1" is written, the selected disk is regarded as a disk having previously been outside the stocker and the process proceeds to step 103.

When "0" is written, the selected disk is regarded as a disk having never been outside the stocker, and the disk historical information determiner 81*b*, i.e. the history determining means 81 directs the recording means 35 to perform normal recording. Then, the process proceeds to step 104.

Step 103 (ST103): A message to confirm whether the user verifies the information to be recorded or not is displayed on the display 32. In response to the message, the user inputs a direction as to whether to perform the verification or not with the selective direction means 33. When the user inputs a direction to perform the verification, the verifying means 34 directs the recording means 35 to perform recording with verification and the process proceeds to step 105 (ST105). When the user inputs a direction not to perform the verification, the verifying means 34 directs the recording means 35 to perform normal recording and the process proceeds to step 104 (ST104). The recording verification at step 105 will not be described since it is the same as that performed at steps 5 to 10 described with reference to FIG. 8.

Thus, since the user decide whether to perform the verification or not, a problem is solved that the recording speed is reduced by always performing the verification.

Subsequently, the recording of "1" or "0" onto the disk management area 53 will be described with reference to FIG. 13.

In this description, it is assumed that "0" is recorded on the disk management area 53 of the disk incorporated in the jukebox 61 at the time of shipment from the factory. The recording/reproducing apparatus which performs the data recording onto the disk management area 53 is not the jukebox 61.

Before describing the operation, a disk where "1" is necessarily written on the disk management area 53 will be further described. Whether a disk outside the stocker 63 will be mounted in the stocker 63 in the future or not is unpredictable. Therefore, for disks capable of being used for both recording and reproduction, it is necessary to write "1" on the disk management area 53 regardless of whether they are cased or not unless there is no likelihood that they are touched by the user.

The recording/reproducing apparatus described here has substantially the same structure as the recording/reproducing apparatus using the optical disk 144 of recording/reproduction-type described with reference to FIG. 15 except that "1" can be recorded on the disk management area 53 as described above.

Figure 13:
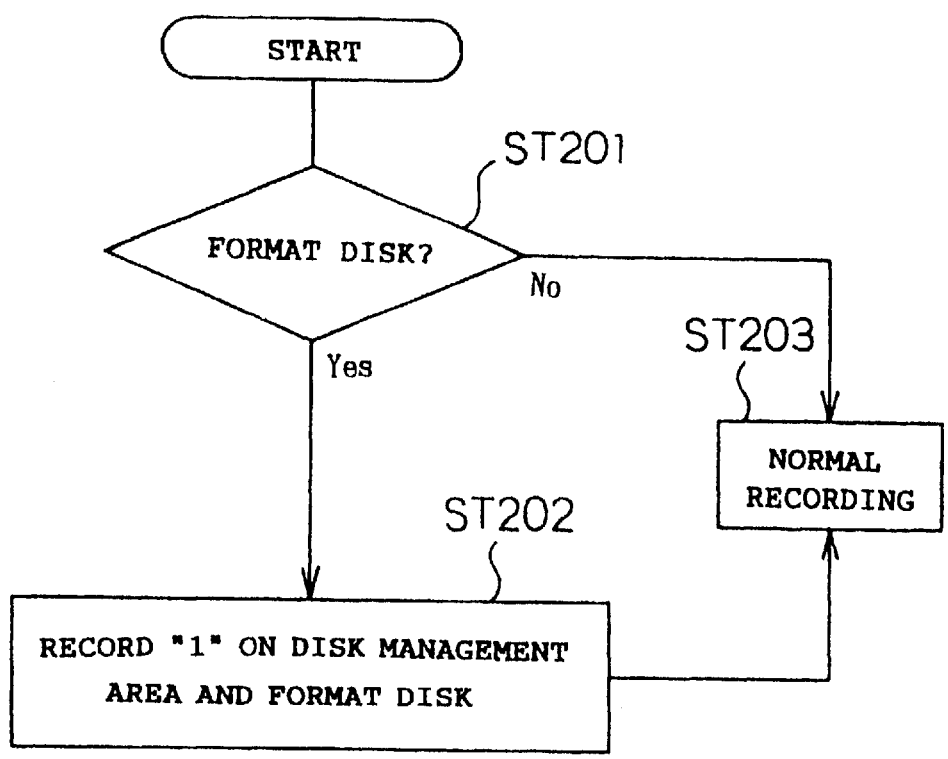
FIG. 13 is a flowchart for explaining an operation of a recording/reproducing apparatus capable of writing "1" on a disk management area.

Referring to FIG. 13, when a disk is mounted in the recording/reproducing apparatus and the user provides a direction to perform recording, a message to confirm whether to format the disk or not is always displayed on a predetermined display means (step 201 (ST201)). In response to the message, the user inputs, when the disk is a new disk, a direction to format the disk with a formatting selective direction means. When a direction to format the disk is input, a management information recording means writes "1" on the disk management area 53 and at the same time, formats the disk (step 202 (ST202)). Then, normal recording is performed (step 203 (ST203)). When the disk has already been formatted, the user inputs a direction not to format the disk with the formatting selective direction means. When a direction not to format the disk is input, the recording means performs normal recording (step 203). When the so-called non-cased disk is mounted, the same operation is performed.

Alternatively, as another example of the recording of "1" or "0" onto the disk management area 53, the following arrangement may be employed:

When the disks are made for specific purposes such as for jukeboxes and for other apparatuses, for example, "0" is recorded on the disks for jukeboxes and "1" is recorded on the other disks. This is an example of the present invention as claimed in claim 15.

As described above, according to the embodiment, since the recording verification can be performed in accordance with the historical information of a plurality of disks housed in the jukebox, the reliability of the recorded information is ever more improved and the difference in reliability between the disks is reduced.

In the above-described embodiment, the disk where "1" is necessarily recorded on the disk management area was described as follows:

Whether a disk outside the stocker 63 will be mounted in the stocker 63 in the future or not is unpredictable. Therefore, for disks capable of being used for both recording and reproduction, it is necessary to write "1" on the disk management area 53 regardless of whether they are cased or not unless there is no likelihood that they are touched by the user.

On the contrary, hereinafter, a disk where "1" is necessarily recorded on the disk management area will be described on an assumption different from that of the above-described case.

That is, in the following description, it is assumed that in order to perform recording onto the disk 64 outside the stocker 63, the disk 64 must be cased, i.e. that recording cannot be performed unless the disk 64 is cased.

More specifically, when the user intends to perform recording onto the disk 64 not being cased outside the stocker 63, for example, recording cannot be performed unless the user purchases an unbundled disk case and sets the disk 64 in the disk case.

When recording is performed in this way, "1" is always recorded on the disk management area 53.

Therefore, for example, whether "1" or "0" is written onto the disk management area 53 when the disk is formatted may be decided according to whether the disk is cased or not when the writing is performed. In other words, the disk where "1" is necessarily recorded on the disk management area is a disk being cased. The case where the disk management information is written at the time of manufacture will be described later.

Specifically, in the recording/reproducing apparatus, for example, the determining means determines whether the disk is being cased or not when the disk is formatted. When it is determined that the disk is being cased, "1" is written on the disk management area 53.

The case where the disk management information is written at the time of manufacture will be briefly described. In this case, on the assumptions (1) that the disks are manufactured for specific purposes, for example, for use in jukeboxes and for use being cased, and (2) that the bare disks in the jukebox are never taken out of the stocker for use but the disks used being cased may be taken out of the case and mounted in the stocker, the disk management information is written based on the following criterion of judgment: On the disks used without being cased, "0" is written as the disk management information, and on the disks used being cased in a case from which a disk can be taken out, "1" is written.

The basic operations of the recording/reproducing apparatus and the jukebox for which the disks on which the management information is written as described above are the same as those of the apparatuses described with reference to FIGS. 8 and 12. That is, when "1" is written as the management information, the recording verification is enabled. Therefore, in such a case, the same advantages as those of the above-described embodiment are obtained.

While in the above embodiment, a case is described where the selective direction means receives the user's direction, the present invention is not limited thereto. The recording verification may be always performed according to the result of the determination by the history determining means.

While in the above embodiment, when the verifying means determines that the number of errors is beyond the correctable range, the process proceeds to step 8 to perform the above-described operation, the present invention is not limited thereto. For example, the process may be forcefully terminated without proceeding to step 8 to perform re-recording. In this case, a message informing that the information recorded just now includes errors may be displayed on the display.

While in the above embodiment, the re-recording by the verifying means is performed on the same area of the disk, the present invention is not limited thereto. Re-recording may be performed, for example, on another area of the disk.

While in the above embodiment, re-recording is always performed when the number of uncorrectable errors is beyond a predetermined range, the present invention is not limited thereto. For example, the process may be forcefully terminated without performing re-recording. In this case, a message informing that the information recorded just now includes errors may be displayed on the display.

While in the above embodiment, it is assumed that there is only one reference value for the predetermined range of the number of uncorrectable errors, the present invention is not limited thereto. For example, a plurality of reference values of determination may be provided for the case where the number of uncorrectable errors is beyond the predetermined range so that according to the number of uncorrectable errors which is beyond the predetermined range, (1) the process is forcefully terminated, or (2) re-recording is performed onto another area, or (3) re-recording is performed onto the same area.

As is clear from the above, the present invention has an advantage that the reliability of the recorded data is ever more improved.

Subsequently, another embodiment of the present invention will be described with reference to the drawings.

In this invention, recording and reproduction is performed of a special disk having undergone a special surface treatment so that recording may be performed even when the disk is taken out of the case.

Moreover, in this embodiment, when recording is performed of a disk onto which recording is not correctly performed when the disk is taken out of the case, the above-described history determination is not performed, that is, it is not performed to determine whether the disk has previously been taken out of the case or not to change the recording mode, but recording is inhibited or recording with a condition such as after-defect-inspection recording or defect-inspecting after recording is performed.

Figure 14:
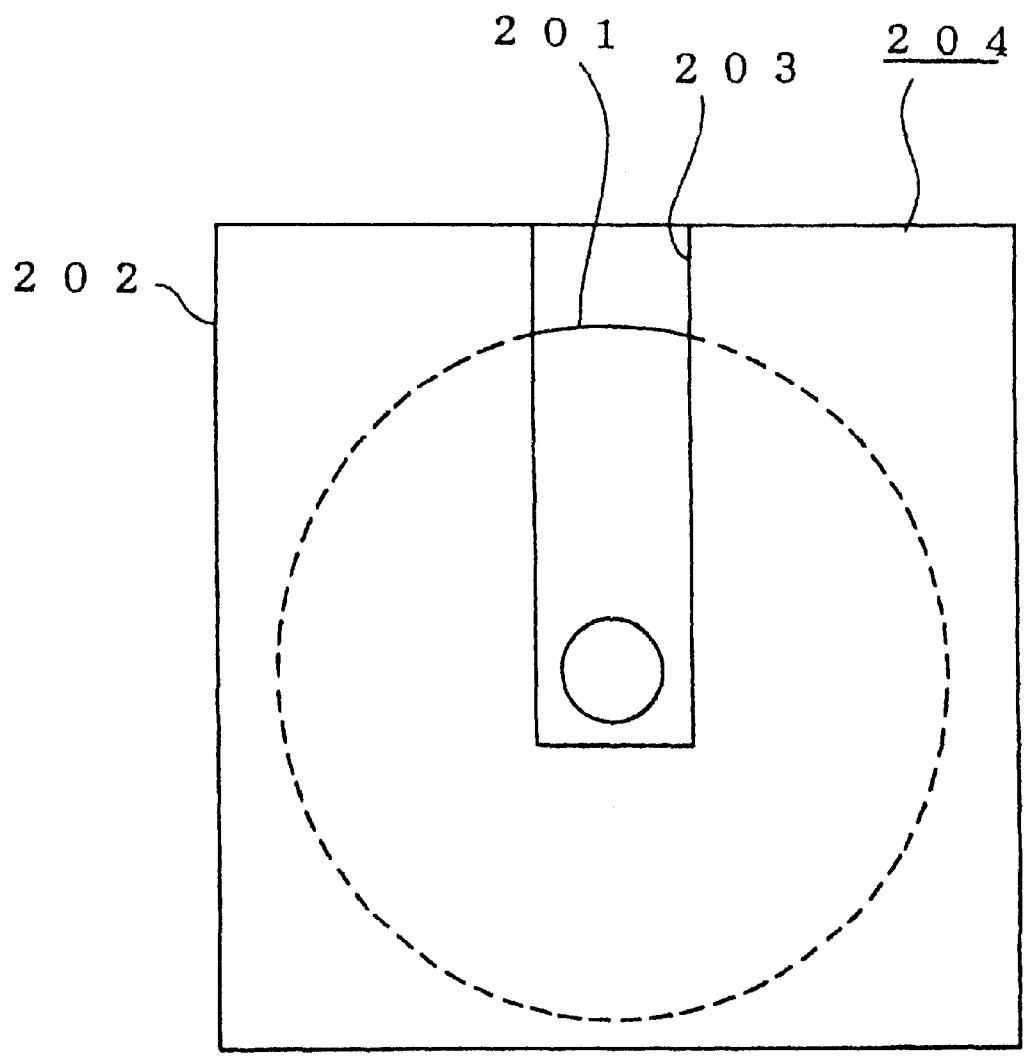
FIG. 14 is a plan view of a conventional optical disk.

In the present invention, a case as shown in FIG. 14 from which the disk cannot be taken out is also used.

(First Embodiment)

FIGS. 17(*a*) and 17(*b*) show a recording/reproducing optical disk as an information recording/reproducing medium according to an embodiment of the present invention. In the figure, 101 is a first optical disk for which recording is inhibited or recording with a condition such as after-defect-inspection recording or defect-inspecting after recording is enabled when it is used singly. The first optical disk has a spiral continuous information track 102. At the head of the information track 102 is formed a first optical disk identification code 103 functioning as a medium identifying information section.

Reference designation 104 is a second optical disk for which normal recording is performed even when it has previously been taken out from the case, i.e. when it is used singly. The second optical disk 104 has an information track 105 similar to that of the first optical disk 101. At the head of the information track 105 is formed a second optical disk identification code 106 functioning as a medium identifying information section. The second optical disk for which normal recording may be performed even when the disk has previously been taken out of the case is realized, for example, by covering the disk surface with an antistatic coating or surface-treating the disk so that the surface is not readily blemished by fingerprints.

Figure 18:
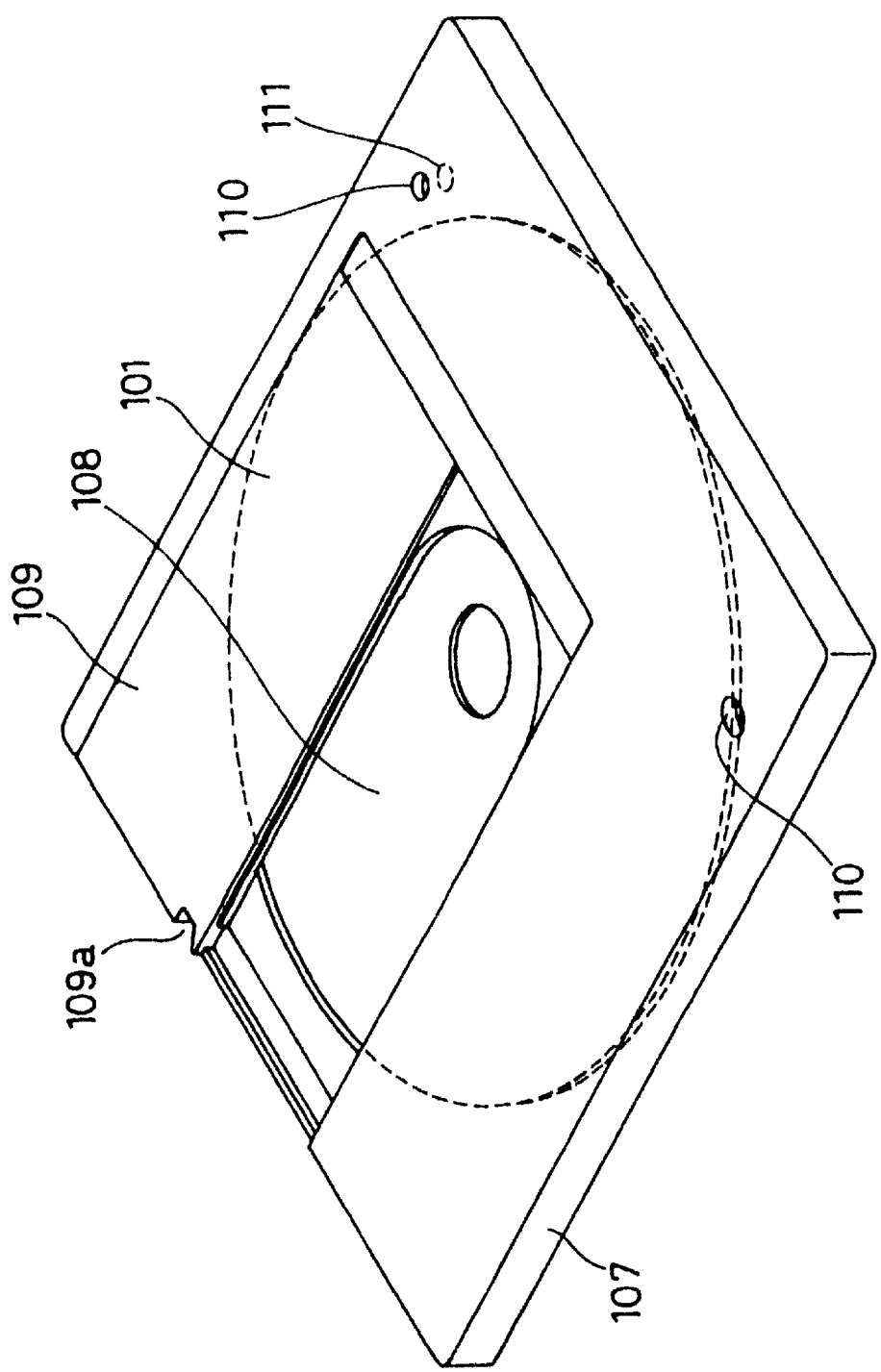
FIG. 18 is a perspective view of a first case for housing the optical disk therein according to the embodiment of the present invention.

FIG. 18 is a perspective view of a first case for housing the optical disk therein according to the embodiment of the present invention. In the figure, reference designation 107 is a first case in which the first optical disk 101 or the second optical disk 104 is housed. The optical disk cannot be taken out from the first case 107. Reference designation 108 is an opening for inserting therein subsequently-described optical pickup 117 and disk motor 116. Reference designation 109 is a shutter for opening and closing the opening 108. Reference designation 109*a* is an opener concave formed on the shutter 109. Reference designation 110 is a positioning hole engaged with a pin 18*a* of a subsequently-described optical disk apparatus to set the case 107 in position. Reference designation 111 is a case identification hole functioning as a case identifying information section. The case identification hole 111 is closed in the first case 107. A case detecting switch 120 of the subsequently-described optical disk apparatus abuts a portion on the case surface in the vicinity of the positioning hole 110 which portion has a function as a case presence/absence information section of the present invention.

Figure 19A:
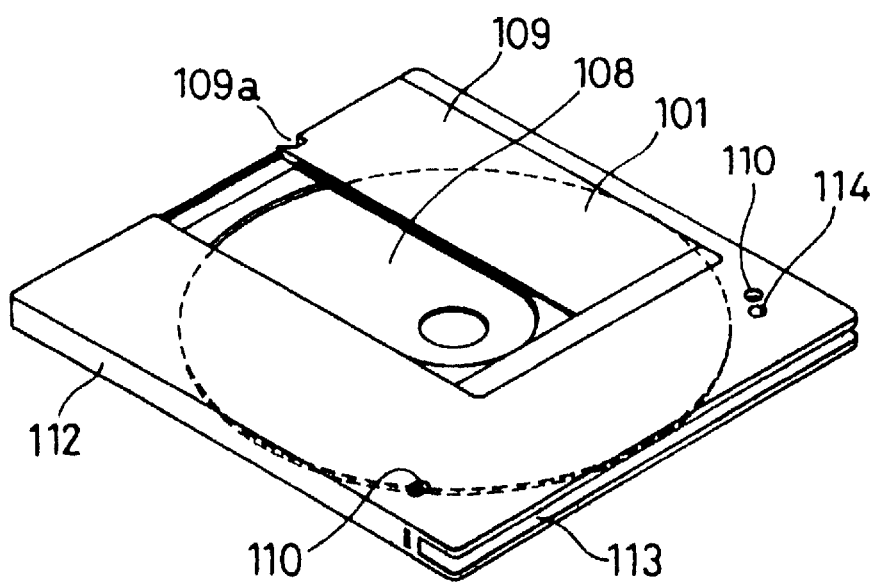
FIG. 19(a) and FIG. 19(b) are perspective views of a second case for housing the optical disk therein according to the embodiment of the present invention.
Figure 19B:
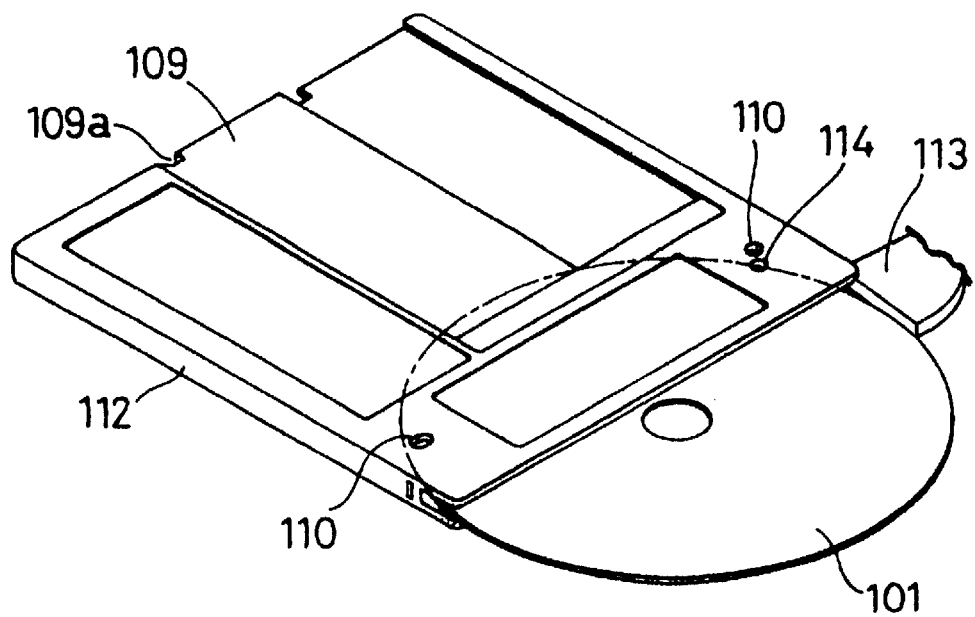

FIGS. 19(*a*) and 19(*b*) are perspective views of a second case for housing the optical disk therein according to the embodiment of the present invention. FIG. 19A shows a condition where the optical disk is housed. FIG. 19B shows a condition where the optical disk is being taken out. In FIG. 19, the same reference designations as those of FIG. 18 denote the same embers and will not be described. In FIG. 19, reference designation 112 is a second case. On the back surface of the second case 112, a pivotable opening/closing lid 113 which enables the optical disk to be taken out is provided, so that the optical disk is dismountably mounted in the second case 112. Reference numeral 114 is a case identification hole for the second case 112 formed in the same position as the case identification hole 111 of the first case 107. The case identification hole 114 is a through hole. The case detecting switch 120 of the subsequently-described optical disk apparatus abuts a portion on the case surface in the vicinity of the positioning hole 110 which portion has a function as the case presence/absence information section of the present invention.

There are six combinations of the first and second optical disks and the first and second cases, and the recording mode is changed according to the combinations.

Table 1 shows examples of the combinations. As shown in Table 1, the optical disk apparatus changes the recording mode according to the combinations.

TABLE 1

| Kind of the Optical Disk | Kind of the Case | Recording Method |
| --- | --- | --- |
| 1st optical disk | No case | Recording inhibited or after-defect-inspection recording |
| 2nd disk | 1st case | Normal recording |
| 1st optical disk | 1st optical disk | Recording inhibited or after-defect-inspection recording |
| 2nd optical disk | No case | Normal recording |
| 2nd optical disk | 1st case | Normal recording |
| 2nd optical disk | 2nd case | Normal recording |

Referring to Table 1, for the second optical disk 104, normal recording may be performed regardless of the presence or absence of the case. For the first optical disk 101, the condition of use differs according to the presence or absence of the case and the kind of the case. For the first optical disk 101 housed in the first case 107, normal recording may be performed. This is because the surface of the optical disk is hardly blemished by dust or fingerprints since the disk is never taken out of the case. This condition corresponds to the normal use of the conventional optical disks.

For the first optical disk 101 housed in the second case 112, recording is inhibited or after-defect-inspection recording may be performed. This is because in the case of the second case, the surface of the optical disk 101 which may have previously been taken out can be blemished by fingerprints or the like. Therefore, recording is performed after the information track is inspected for defects so that recording is made onto a portion of the information track where there is no defect to improve the reliability of the recording. When the first optical disk 101 is housed in the second case 112, recording is ensured after the defect inspection because the disk surface is hardly blemished by dust or fingerprints. Needless to say, recording may be inhibited.

When the first optical disk 101 is not housed in the case, recording is not permitted but only reproduction is performed. Needless to say, after-defect-inspection recording may be performed.

While whether to inhibit recording or perform after-defect-inspection recording largely depends on the environment in which the optical disk apparatus is placed, considering the possibility for the disk surface to be blemished by dust during recording, it is safer to inhibit recording.

The condition setting of Table 1 is merely an example and may be changed according to the use environment.

Figure 20:
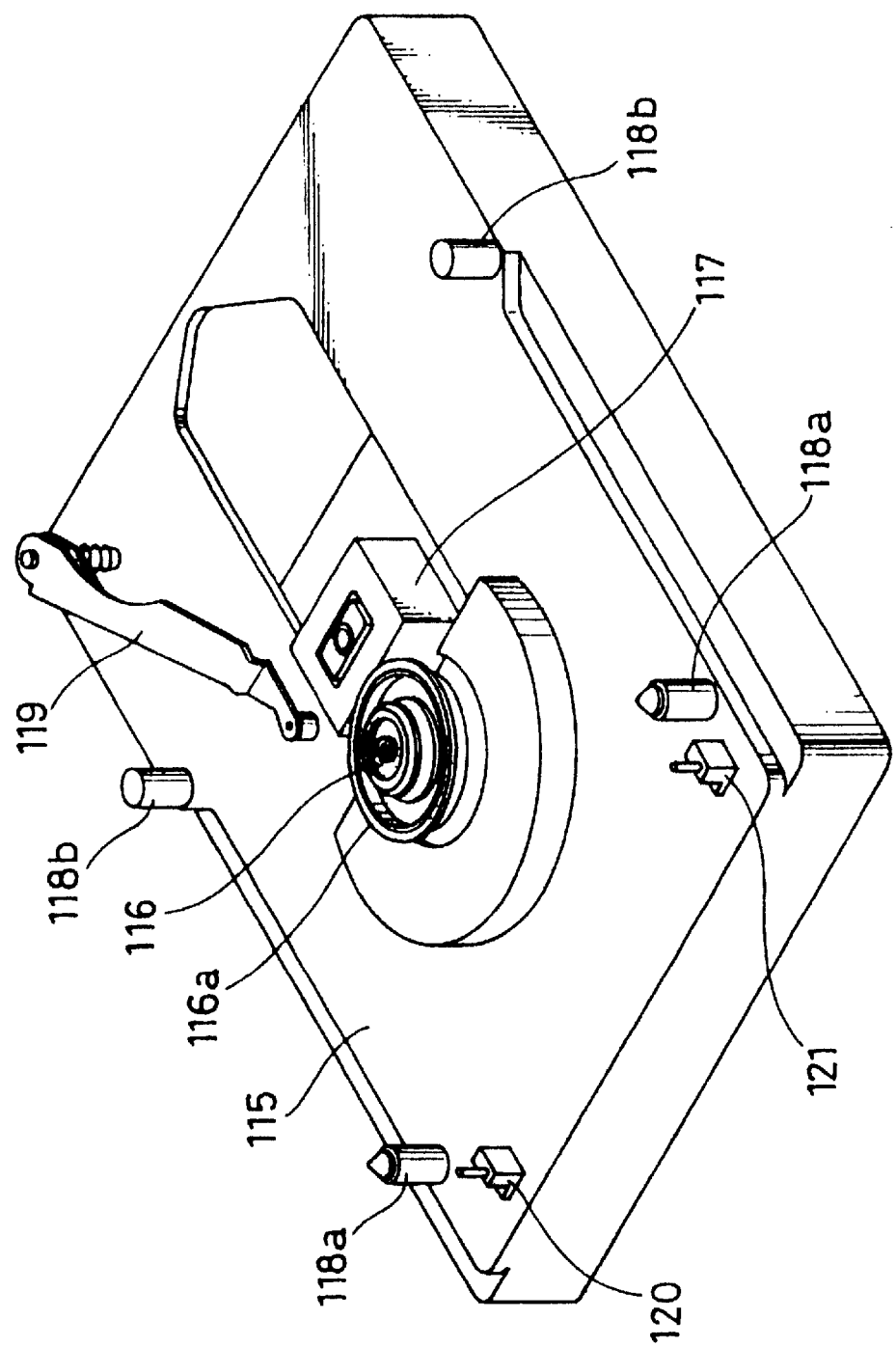
FIG. 20 is a perspective view of a recording/reproducing optical disk apparatus according to the embodiment of the present invention.

Subsequently, the structure of the optical disk apparatus employing the optical disk structured as described above and the case for housing the disk therein will be described. FIG. 20 is a perspective view of the recording/reproducing optical disk apparatus according to the embodiment of the present invention. For ease of understanding, portions irrelevant to the present invention are not shown. In the figure, reference designation 115 is a base provided with the disk motor 116 having a turntable 116a on which the first optical disk 101 or the second optical disk 104 is placed, the optical pickup 117, positioning pins 118a and 118b for positioning the first case 107 or the second case 112, a pivotable shutter opener 119 pushed by a spring for opening and closing the shutter 109, the case detecting switch 120 for detecting the presence or absence of the case, and a case identifying switch for identifying the kind of the case.

A recording method will be described of an information recording/reproducing apparatus based on the arrangement described above.

Figure 21:
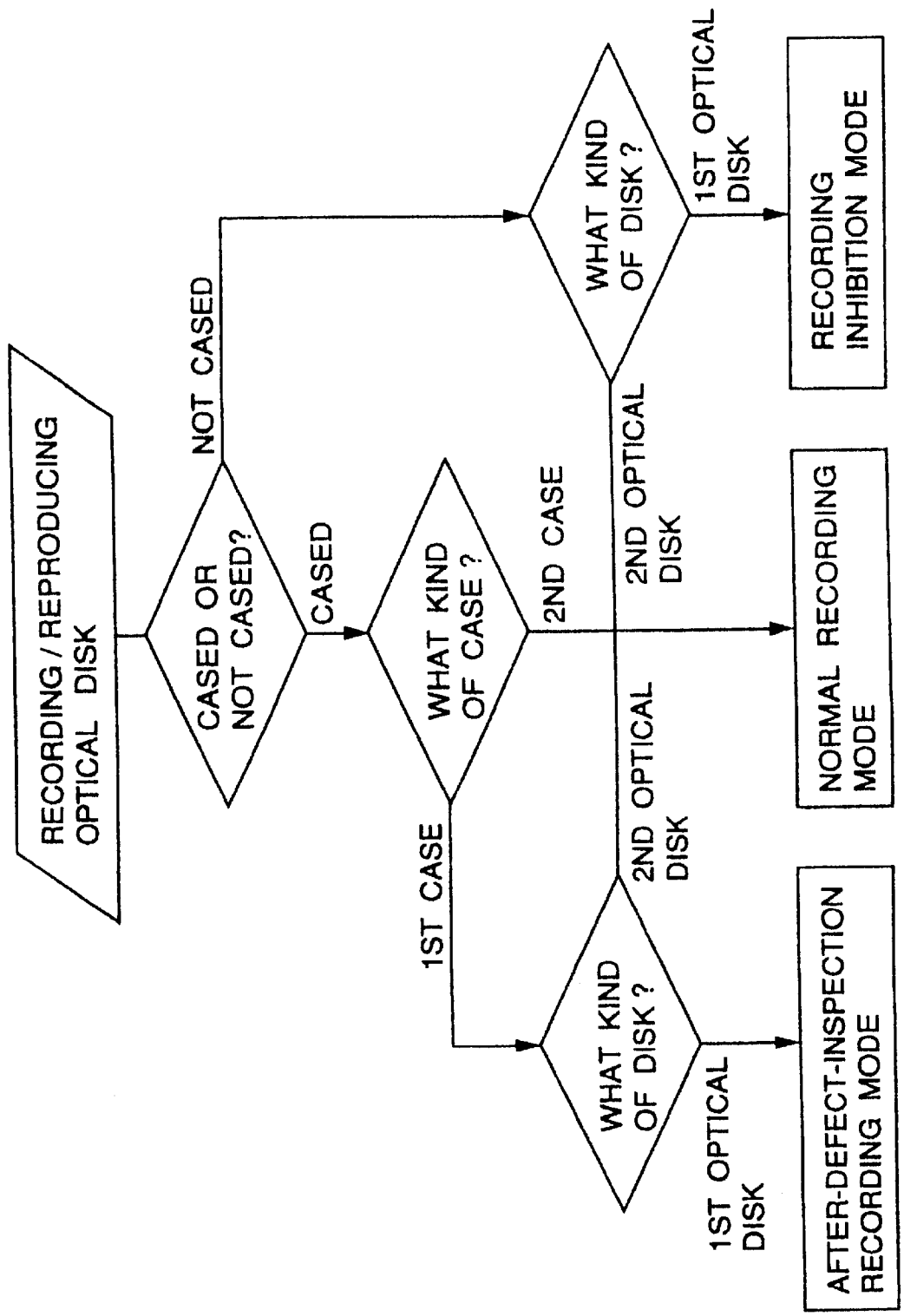
FIG. 21 shows a sequence of a method for identifying the recording/reproducing optical disk according to the embodiment of the present invention.

FIG. 21 shows a sequence of an example of the recording method according to the present invention.

The information recording/reproducing apparatus first determines whether the optical disk is being cased or not. When it is being cased, the kind of the case is determined.

When the case is determined to be the second case, the information recording/reproducing apparatus is placed in the normal recording mode. When the case is determined to be the first case, the kind of the optical disk is determined.

When the optical disk is determined to be the first optical disk, the information recording/reproducing apparatus is placed in the after-defect-inspection recording mode. When the optical disk is determined to be the second optical disk, the information recording/reproducing apparatus is placed in the normal recording mode.

When the optical disk is not being cased, the kind of the optical disk is determined. When the optical disk is determined to be the first optical disk, the information recording/reproducing apparatus is placed in the recording inhibition mode. When the optical disk is determined to be the second optical disk, the recording/reproducing apparatus is placed in the normal recording mode.

Figure 22A:
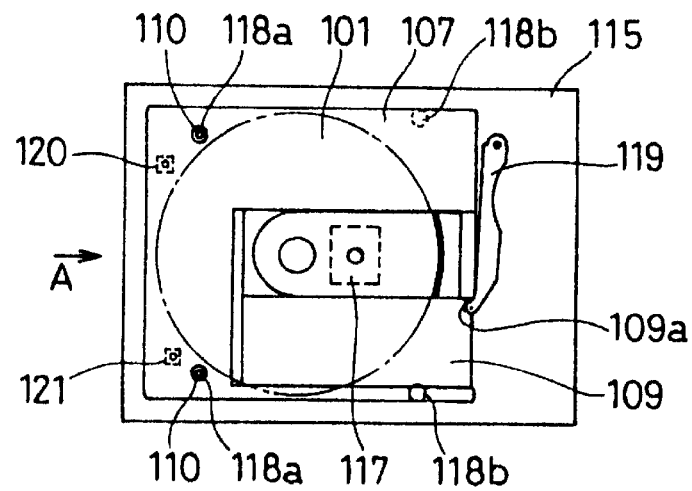
FIGS. 22(a)–22(c) show conditions where a case housing an optical disk therein or an optical disk not being cased is mounted in the recording/reproducing optical disk apparatus according to the embodiment of the present invention.
Figure 22B:
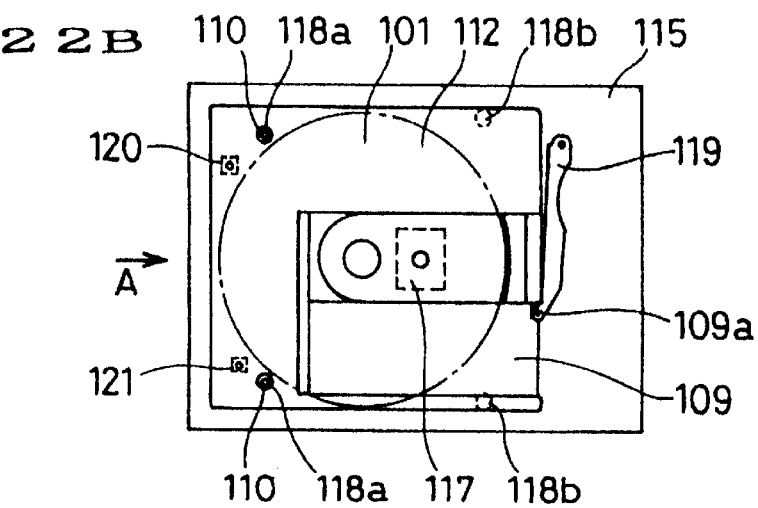
Figure 22C:
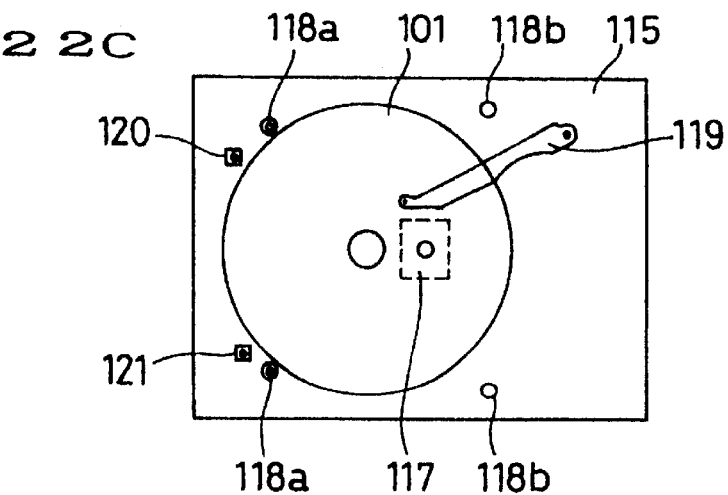

A specific operation of the recording method will be described with reference to FIGS. 22(a)–22(c). FIGS. 22(a)–22(c) show conditions where a case housing an optical disk therein or an optical disk not being cased is mounted in a recording/reproducing optical disk apparatus. FIG. 22A shows the first case 107 mounted in the optical disk apparatus. FIG. 22B shows the second case 112 mounted in the optical disk apparatus. FIG. 22C shows the first optical disk 101 or the second optical disk 104 mounted in the optical disk apparatus.

First, an operation will be described to mount in the optical disk apparatus the first case 107 housing the first optical disk 101 therein. Referring to FIG. 22A, when the first case 107 mounted in a non-illustrated case holder is inserted in the direction of the arrow A, the shutter opener 119 engages with the opener concave 109a of the shutter 109 to move the shutter 109 in a direction to open the opening 108. After the opening 108 is completely opened, the first case 107 is lowered by a non-illustrated loading mechanism, so that the positioning pin 118a is inserted into the positioning hole 110 and the positioning pin 118b abuts the upper surface of the first case 107 to complete the mounting of the first case 107. At this time, the disk motor 16 and the optical pickup 17 are inserted in the opening 108 and the first optical disk 101 is placed on the turntable 116a. The case detecting switch 120 abuts the upper surface of the first case 107 and the case identifying switch 121 abuts the case identification hole being closed.

The optical disk apparatus recognizes that the first case 7 is mounted based on detection signals from the case detecting switch 120 and the case identifying switch 121. Then, the disk motor 116 is started and the optical pickup 117 is moved to a predetermined position by a non-illustrated optical pickup transporting means to read the optical disk identification code in the information track 2 of the first optical disk 101.

By the above-described operation, of the six conditions of use shown in Table 1, the optical disk apparatus recognizes that the disk mounted is the first optical disk 101 housed in the first case 107 from which the optical disk cannot be taken out, and switches to the normal recording mode to record or reproduce information onto or from the first optical disk 101. The same is performed when the disk mounted is the first case 107 housing the second optical disk 104 therein.

Subsequently, an operation to mount in the optical disk apparatus the second case 112 housing the first optical disk 101 therein will be described with reference to FIG. 22B. Since the basic part of the operation is the same as that of FIG. 22A, only the different part will be described. The case identification hole 114 of the second case 112 is a through hole, so that the case identifying switch 121 is inserted into the case identification hole and does not abut the case. Consequently, the case identifying switch 121 of the second case 112 operates differently from that of the first case 107. The optical disk apparatus recognizes that the second case 112 is mounted based on signals from both the case detecting switch 120 and the case identifying switch 121. Then, the optical disk apparatus recognizes that the first disk 101 is mounted by the previously-described operation, and then, switches to the after-defect-inspection recording mode to record or reproduce information onto or from the first optical disk 101. When the second case 112 housing the second optical disk 104 therein is mounted, the optical disk apparatus is placed in the normal recording mode.

Lastly, an operation to mount in the optical disk apparatus the first optical disk 101 not being cased will be described with reference to FIG. 22C. When mounted in a non-illustrated case holder, the first optical disk 101 is lowered by a non-illustrated loading mechanism and placed on the turntable 116a of the disk motor 116. When the first optical disk 101 is moved, the shutter opener 119 does not contact the first optical disk 101. Since the case detecting switch 120 and the case identifying switch 121 are disposed in positions not to abut the first optical disk 101, the switches 120 and 121 operate differently from those of FIGS. 22A and 22B, so that the optical disk apparatus recognizes that the optical disk is not being cased. The optical disk apparatus recognizes that the first optical disk 101 is mounted by the previously-described operation, and then, switches to the recording inhibition mode to reproduce information from the first optical disk 101. When the second optical disk 104 not being cased is mounted, the optical disk apparatus is placed in the normal recording mode.

While cases having two different functions are described in this embodiment, it is needless to say that the same arrangement may be applied also when there is only one kind of case and when there are three or more disk functions.

The recording with a condition in the present invention includes after-recording verification in addition to the above-described after-defect-inspection recording.

While a system using a recording/reproducing optical disk is described in this embodiment, the present invention may be applied to a system using an information recording/reproducing medium other than the optical disk.

Subsequently, a case will be described where the second implementation of the present invention is applied to the above-described jukebox. In the case of the jukebox, since recording is performed only when the optical disk is not being cased, the setting as shown in Table 2 is considered.

TABLE 2

| Kind of the Optical Disk | Recording Method |
| --- | --- |
| 1st optical disk | Recording inhibited or after-defect-inspection recording |
| 2nd optical disk | Normal recording |

In the case of the first optical disk, since it is unclear whether the disk was factory-mounted in the jukebox or was taken out from the second case and mounted in the jukebox, it is desired to inhibit recording or to perform after-defect-inspection recording.

In the case of the second optical disk, normal recording is performed.

Further, when there is a management area in which an identifying information is written for identifying whether the first optical disk is used by normal recording or is used with inhibited recording or condition recording, the jukebox selects the manner of recording by reading the identifying information.

(Second Embodiment)

Figure 23:
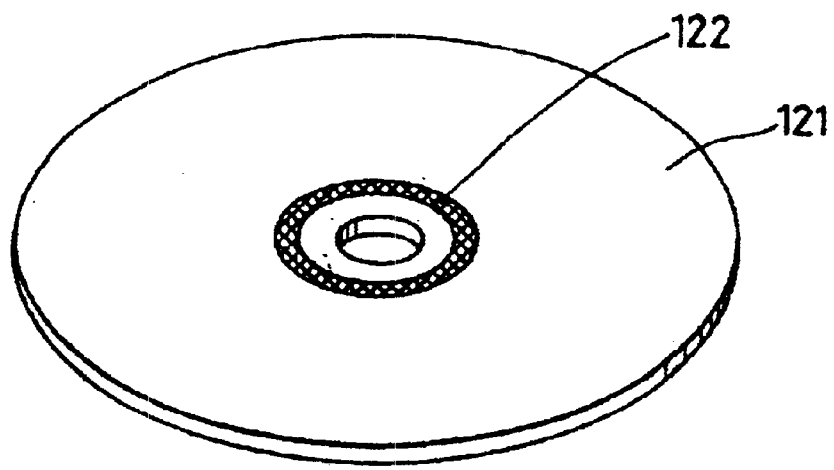
FIGS. 23(a) and 23(b) show a recording/reproducing optical disk according to another embodiment of the present invention.
Figure 23:
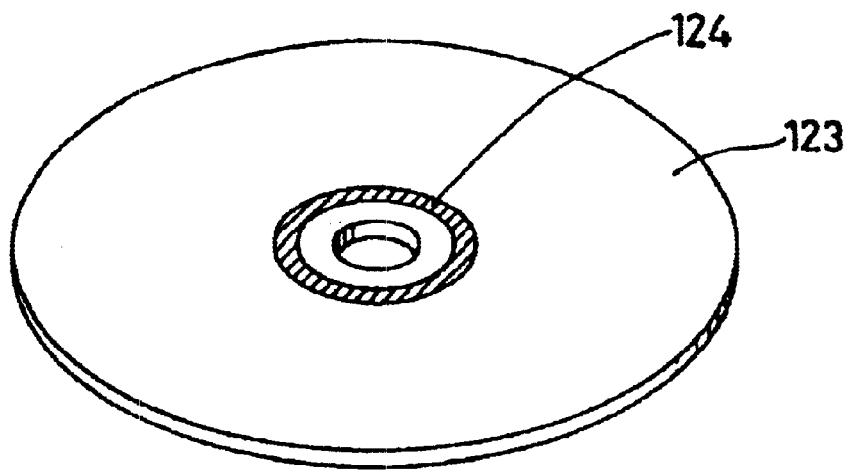

Subsequently, another embodiment of the medium identifying information section according to the present invention will be described. FIGS. 23(a) and 23(b) show a recording/reproducing optical disk according to another embodiment of the present invention. In the figure, reference designation 121 is a first optical disk for which recording is inhibited or recording with a condition such as the after-defect-inspection recording is performed when the disk is not being cased. The first optical disk 121 has a spiral continuous information track for information recording and reproduction. A label 122 which absorbs light of a predetermined wavelength is printed on the surface onto which light is projected from the optical pickup and the surface opposite thereto. The printed portion constitutes the medium identifying information section of the first optical disk 121. Reference designation 123 is a second optical disk for which normal recording may be performed even when the disk is not being cased. The second optical disk 123 has an information track similar to that of the first optical disk 121. A label 124 which absorbs light of a different wavelength as the label 122 of the first optical disk 121 is printed in the same position as the label 122. The printed portion constitutes the medium identifying information section of the second optical disk 123.

Figure 24:
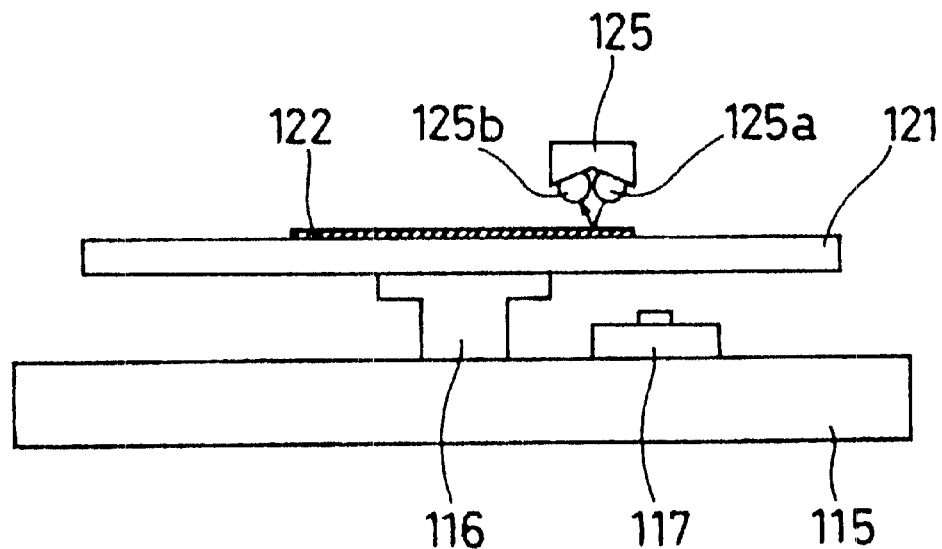
FIG. 24 shows a recording/reproducing optical disk apparatus according to another embodiment of the present invention.

The optical disk apparatus has a light receiving/emitting device 125 as shown in FIG. 24. Light from a light emitting device 125a is reflected by the label 122 or 124 to be incident on a light receiving device 125b. The light receiving device 125b is highly sensitive to the label 122 in the vicinity of the wavelength of the light absorbed by the label 122.

Consequently, when the first optical disk 121 is mounted, the light from the light emitting device 125a is reflected by the label 122 with the light of the predetermined wavelength being absorbed, so that the output from the light receiving device 125b is smaller. In the case of the label 124, the absorption of light of the predetermined wavelength is smaller, so that the output from the light receiving device 125b is greater. Based on the output level, the optical disk apparatus determines whether the disk mounted is the first optical disk 121 or the second optical disk 123. Moreover, the labels enable visual identification of the kind of the optical disk, so that the user is easily identify the kind of the disk.

(Third Embodiment)

Figure 25:
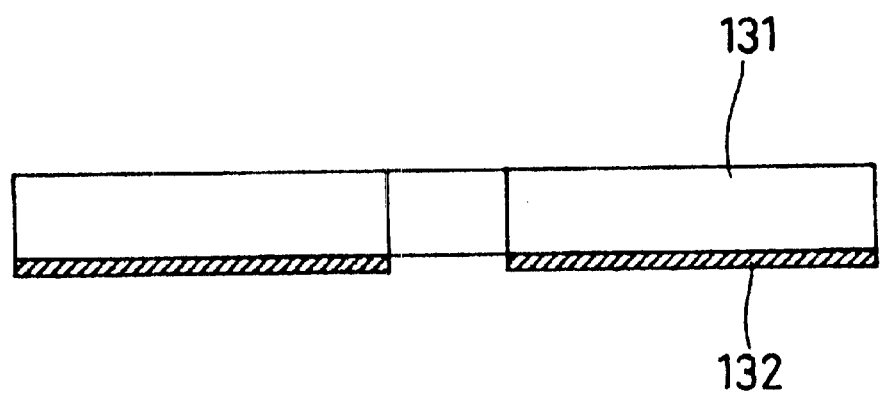
FIG. 25 shows a recording/reproducing optical disk according to another embodiment of the present invention.

Another embodiment of the medium identifying information section according to the present invention will be described. FIG. 25 shows a recording/reproducing optical disk according to another embodiment of the present invention. In the figure, reference designation 131 is a second optical disk for which normal recording may be performed even when the disk is not being cased. The surface onto which light from the optical pickup is projected is covered with a coating 132 to prevent the surface from being readily blemished by dust or fingerprints. The surface absorbs light of a different wavelength from that of the light absorbed by the first optical disk.

The optical disk apparatus has a light receiving/emitting device similar to the light receiving/emitting device 125 shown in FIG. 24. Light from the light emitting device is reflected by the coating 132 to be incident on the light receiving device. The light receiving device is highly sensitive to the coating 132 in the vicinity of the wavelength of the light absorbed by the coating 132. In this arrangement, the same advantages as those of the second embodiment are obtained.

As described above, according to the information recording/reproducing medium identifying method of the present invention, for various conditions of use where the information recording/reproducing media having different functions are used being cased or without being cased, the information recording/reproducing medium may be used under a predetermined optimum recording/reproduction condition, so that the system using the information recording/reproducing medium may be extended while the reliability of the recording and the compatibility between systems are ensured. Thus, the present invention is highly advantageous.

Further an embodiment of another present invention is described.

In this invention, recording and reproduction is performed of a special disk having undergone a special surface treatment so that recording may be performed even when the disk is taken out of the case.

Further in the embodiment, when recording is performed of a disk onto which recording is not correctly performed when the disk is taken out of the case, the above-mentioned history determination is performed, that is, it is performed to determine whether the disk has previously been taken out of the case or not, to change the recording mode according to the determination. For example, recording is inhibited or recorded normally or recorded with a condition such as after-defect-inspection recording or defect-inspecting after recording.

That is the present invention is such method for determining whether or not a medium being cased and capable of being used for information recording and reproducing, has previously been taken out from the case by using an identification section having historical information as to whether the medium has previously been taken out from the case or not; and when a result of the determination shows that the medium has previously been taken out from the case,
for verifying correctness of information after recorded or recording after verification of correctness of information always or on condition that a predetermined condition is satisfied, or inhibiting the recording, if the medium is a first recording/reproducing information medium that is required to use a case at recording, and
for recording normally if the medium is a second recording/reproducing information medium that is not required to use a case at recording.

And the present invention is such apparatus having history determination means for determining whether or not a medium being cased and capable of being used for information recording and reproducing, has previously been taken out from the case by using an identification section having historical information as to whether the medium has previously been taken out from the case or not; and means, when a result of the determination shows that the medium has previously been taken out form the case,
for verifying correctness of information after recorded or recording after verification of correctness of information always or on condition that a predetermined condition is satisfied, or inhibiting the recording, if the medium is a first recording/reproducing information medium that is required to use a case at recording, and
for recording normally if the medium is a second recording/reproducing information medium that is not required to use a case at recording.

Meanwhile when a result of the determination does not show that the medium has previously been taken out from the case, the normal recording is executed.

What is claimed is:

1. An information recording medium comprising:
   a data area for writing data thereon; and
   a management area for writing management information thereon, said management information indicating whether the medium has previously been removed from a stocker.

2. An information recording medium as claimed in claim 1, wherein
   said management information is used for determining whether to verify correctness of the recorded information after the recording of the information on the information recording medium.

3. An information recording medium as claimed in claim 1, wherein said management area is for writing said management information thereon to determine whether the medium is being used for information recording and reproduction and with a case or without a case.

4. An information recording medium as claimed in claim 3, wherein said information recording medium used with an information recording apparatus, wherein
   for at least one of
   i) the medium used without the case, management information indicating that the medium is used without the case is written by the information recording apparatus on the management area, and
   ii) the medium used with the case, management information indicating that the medium is used with the case is written by the information recording apparatus on the management area.

5. An information recording medium as claimed in claim 4, wherein
   the management information is written by the information recording apparatus when the information recording medium is formatted.

6. An information recording medium as claimed in claim 4, wherein
   the management information is written by the information recording apparatus when the information recording medium is manufactured.

7. An information recording apparatus for use with information media comprising:
   a stocker for housing therein a predetermined number of uncased information media; and means of recording information onto the uncased information media housed in the stocker, wherein said information media includes a medium factory-mounted in the stocker and a medium mounted in the stocker from outside the stocker, and said information media each have respective data area for writing data thereon to be recorded and a respective management area for writing management information thereon indicating whether the medium has previously been removed from the stocker.

8. An information recording apparatus as claimed in claim 7, further comprising:

history determining means of determining whether the medium has previously been removed from the stocker based on the management information; and verifying means of verifying correctness of information recorded i) always or ii) on condition that a predetermined condition is satisfied when a result of the determination indicates that the medium has previously been removed from the stocker.

9. An information recording apparatus as claimed in claim 8, wherein an output of the history determining means is externally displayed on display means, selective direction means is provided for accepting a selective direction as to whether the verification is performed, and said predetermined condition is the selective direction.

10. An information recording apparatus as claimed in claim 8, further comprising:

forceful termination/re-recording means of i) forcefully terminating a subsequent operation or ii) re-recording the information when it is verified that the recorded information is incorrect by the verifying means; and terminating means for terminating the recording when said verifying means verifies that the recorded information is correct.

11. An information recording apparatus comprising:

an information recording medium having a management area for writing management information thereon to determine whether the medium is being used with a case or without a case;

a stocker for housing therein a plurality of individual ones of the information recording medium each without the case; means of recording information onto the information recording media housed within the stocker;

means of determining whether an individual one of the information recording medium is a medium used with the case or without the case based on the management information in the information management area of that recording medium; and means of verifying correctness of information recorded on the information recording medium i) always or ii) on condition that a predetermined condition is satisfied when a result of the determination indicates that the information recording medium is a medium used with the case.

12. An information recording apparatus as claimed in claim 11, wherein for the information recording medium which has never been removed from the stocker, management information indicating that the medium is used without the case is written on the management area, and for the information recording medium which has previously been removed from the stocker, management information indicating that the medium is used with the case is written on the management area.

13. An information recording method for use with an information recording medium having a data area for writing data thereon; and a management area for writing management information thereon, said management information indicating whether the medium has previously been removed from a stocker, said method comprising the steps of:

i) writing management information further indicating that the medium is being used without a case to the management area if the medium is used without the case; and ii) writing management information further indicating that the medium is being used with the case to the management area if the medium is used with the case.

14. An information recording method as claimed in claim 13, wherein the management information is written when the information recording medium is formatted.

15. An information recording method as claimed in claim 13, wherein the management information is written when the information recording medium is manufactured.

* * * * *

UNITED STATES PATENT AND TRADEMARK OFFICE
CERTIFICATE OF CORRECTION

PATENT NO. : 6,683,834 B2
DATED : January 27, 2004
INVENTOR(S) : Shunji Ohara et al.

It is certified that error appears in the above-identified patent and that said Letters Patent is hereby corrected as shown below:

Title page,
Item [56], References Cited, OTHER PUBLICATIONS, delete "International Search Report dated May 8, 1997 corresponding to PCR/JP97/01371" insert -- International Search Report dated May 8, 1997 corresponding to PCT/JP97/01371 --.

Signed and Sealed this

Tenth Day of August, 2004

JON W. DUDAS
*Acting Director of the United States Patent and Trademark Office*